(12) United States Patent
Delorme et al.

(10) Patent No.: US 9,076,111 B2
(45) Date of Patent: Jul. 7, 2015

(54) METHODS OF INTEGRATING MULTIPLE MANAGEMENT DOMAINS

(75) Inventors: Philippe Delorme, St Germain en Laye (FR); Vincent Petit, St Ismier (FR); James Simonelli, Grafton, MA (US); Barry Coflan, North Andover, MA (US); Scott Henneberry, Franklin, TN (US); Ronald Schoop, Seligenstadt (DE); Jean-Louis Bergerand, Saint-Martin d'Héres (FR); Gregory Allen Thompson, Murfreesboro, TN (US); Cyril Perducat, Singapore (FR); Philip E. London, Boxford, MA (US); John Connor, Rowley, MA (US)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 198 days.

(21) Appl. No.: 13/375,883

(22) PCT Filed: Jun. 2, 2010

(86) PCT No.: PCT/US2010/037091
§ 371 (c)(1),
(2), (4) Date: Feb. 9, 2012

(87) PCT Pub. No.: WO2010/141601
PCT Pub. Date: Dec. 9, 2010

(65) Prior Publication Data
US 2012/0131217 A1   May 24, 2012

Related U.S. Application Data

(60) Provisional application No. 61/183,374, filed on Jun. 2, 2009.

(51) Int. Cl.
*G06F 15/16* (2006.01)
*G06Q 10/06* (2012.01)

(52) U.S. Cl.
CPC ..................... *G06Q 10/06* (2013.01)

(58) Field of Classification Search
CPC ...... Y02B 60/1278; G06F 1/3203; G06F 9/00
USPC ................. 709/230, 218, 238, 201
See application file for complete search history.

(56) References Cited

U.S. PATENT DOCUMENTS 8,295,990 B2 * 10/2012 Venkatakrishnan et al. .. 700/296
8,539,567 B1 *  9/2013 Logue et al. ..................... 726/7
(Continued)

FOREIGN PATENT DOCUMENTS

EP           1 956 450 A1    8/2008

OTHER PUBLICATIONS

Written Opinion corresponding to co-pending International Patent Application Serial No. PCT/US2010/037091, United States Patent Office, dated Jan. 20, 2011; (12 pages).

(Continued)

*Primary Examiner* — Kevin Bates
*Assistant Examiner* — Clarence D McCray
(74) *Attorney, Agent, or Firm* — Lando & Anastasi LLP

(57) ABSTRACT

An integrated solution strategy that integrates multiple domains together in a seamless and standardized way for increasing a users control over facilities and equipment. This integrated approach can lead to a reduction of energy usage, more efficient energy usage, increased safety, health, and security of a facility and its occupants, optimized production in industrial settings, and associated and other economic advantages. Accurate, reliable information about a facility or equipment is essential to making timely, informed decisions. Enhanced automation provides a reliable means of collecting and assembling a variety of operating data and archiving that data into a central database for evaluation, reporting, forecasting, and negotiation with resource marketers.

37 Claims, 16 Drawing Sheets

(56) References Cited

U.S. PATENT DOCUMENTS

| | | |
|---|---|---|
| 2006/0168975 A1 | 8/2006 | Malone et al. |
| 2006/0184287 A1* | 8/2006 | Belady et al. ................. 700/291 |
| 2008/0167931 A1* | 7/2008 | Gerstemeier et al. ............. 705/8 |
| 2008/0186148 A1* | 8/2008 | Kwon et al. ............. 340/286.02 |
| 2008/0195687 A1* | 8/2008 | Jung et al. ..................... 709/201 |
| 2009/0055765 A1* | 2/2009 | Donaldson et al. ........... 715/771 |
| 2009/0089709 A1* | 4/2009 | Baier et al. .................... 715/817 |
| 2011/0016342 A1* | 1/2011 | Rowan et al. ................. 713/340 |
| 2011/0202190 A1* | 8/2011 | Venkatakrishnan et al. .. 700/286 |
| 2011/0202194 A1* | 8/2011 | Kobraei et al. ............... 700/295 |
| 2011/0202195 A1* | 8/2011 | Finch et al. ................... 700/295 |
| 2011/0202196 A1* | 8/2011 | Venkatakrishnan et al. .. 700/295 |
| 2011/0202293 A1* | 8/2011 | Kobraei et al. ................. 702/62 |
| 2014/0245368 A1* | 8/2014 | Park et al. ..................... 725/110 |

OTHER PUBLICATIONS

International Search Report corresponding to co-pending International Patent Application Serial No. PCT/US2010/037091, United States Patent Office, dated Jan. 20, 2011; (4 pages).

Supplemental Partial European Search Report from corresponding European Patent 10 72 7242 dated Mar. 3, 2014.

\* cited by examiner

METHODS OF INTEGRATING MULTIPLE MANAGEMENT DOMAINS

CROSS-REFERENCE TO RELATED APPLICATIONS

This application is a U.S. National Stage of International Application No. PCT/US2010/037091, filed Jun. 2, 2010, which claims the benefit of U.S. Provisional Application No. 61/183,374, filed on Jun. 2, 2009, both of which are incorporated herein by reference in their entireties.

FIELD OF THE INVENTION

This invention relates generally to management domains, and, more particularly, methods of integrating multiple management domains.

BACKGROUND

Existing energy management domains have been developed independently of other energy management domains. Each domain can comprise multiple systems that each has its own set of unique architectures and solutions. Within a domain of expertise, such as power monitoring or building management, networked components communicate with one another using a disparate array of protocols, communication and network standards, and application interfaces, which require middleware or other custom solutions to allow intra-domain compatibility among different components. Each system is optimized within its own management domain, often using rudimentary solutions that will not work in other management domains. As a result, valuable information that could be gleaned from a cross-domain perspective cannot be realized. In addition, these custom-optimized systems are time-consuming and expensive to deploy and manage, require extensive and particularized operator training, and require external coordination among different system managers to diagnose a problem or increase efficiency in the system, among other problems. In other words, the non-integration of existing domains is contributing to energy inefficiency and waste, decreased safety, health, and security, and economic stagnation. To date, only short-term solutions are created within a particular management domain and do not attempt to integrate with other management domains because there is no standardization among the components, creating a large disincentive to integrate.

For example, approximately 1.5-2% of the total power consumed by the U.S. is consumed by data centers, and only a small part of that power is actually used. The rest is wasted. A data center is housed in a building, but the building and the data center management systems are developed and implemented separately. A building also has a power monitoring system that monitors power and other electrical characteristics of power-consuming devices in the building. Each of these systems uses devices and components that cannot communicate with one another and that are optimized to work within their own management domain (in the case of a data center, a white space management domain, in the case of a power monitoring system a power management domain, and in the case of a building, a building comfort management domain). For example, data centers typically use highly specialized air conditioners to cool the servers and other heat-sensitive components, and the chilled water used by the data center air conditioners is produced by a chiller that typically resides outside of the building that houses the data center. That same chiller also produces chilled water that is used by the building to create a comfortable environment within the other areas inside the building beyond the data center. The chiller is managed by the building management system, and therefore the white space management system that manages the data center is unaware of important information about the chiller. When a chiller fails, the building management system will be notified, but it is often more critical for the data center to be informed about a chiller failure, as overheating can damage the sensitive electronic equipment in a data center.

The non-integration of the power, white space, and building management systems prevents a facility operator from understanding where the inefficient components in the facility are, or from pinpointing how and where energy is being consumed and wasted within a facility, to name a few shortcomings. Without a "bird's eye" perspective on the entire facility, valuable and critical information is lost and cannot be easily presented to and visualized by the operator.

What is needed, therefore, among other things, is a paradigmatic shift in how different management domains are developed and deployed. The present disclosure fulfills these and other needs.

BRIEF SUMMARY OF THE PRESENT INVENTION

An integrated solution strategy that integrates multiple domains together in a seamless and standardized way significantly increases a user's control over facilities and equipment. Advantageously, this integrated approach can lead to a reduction of energy usage, more efficient energy usage and management of energy, increased safety, health, and security of a facility and its occupants, optimized production in industrial settings, and associated and other economic advantages. Accurate, reliable information about a facility or equipment is essential to making timely, informed decisions. Enhanced automation provides a reliable means of collecting and assembling a variety of operating data and archiving that data into a central database for evaluation, reporting, forecasting, and negotiation with resource marketers. Integrated solution strategies also allow access to specific operating information, virtually anywhere in a facility or on campus that was previously difficult or cost-prohibitive to retrieve. Integrated solution strategies allow users to better respond to potential emergency curtailments by protecting critical systems and by shedding (e.g., removing or decoupling from an electrical circuit) or shifting discretionary electrical and mechanical loads. Integrated solution strategies provide single-seat navigation, where all systems and facilities can be viewed from one workstation. This is the most cost-efficient way to manage a facility or building. Productivity is increased because the building staff is more effective. The need for expensive, after-hours labor can be reduced significantly. Integrated solution strategies enable advanced preventative and predictive maintenance strategies to be put into place, which can extend the life of high-cost capital equipment. With access to the right performance data from multiple domains, failures can be more easily predicted and prevented.

The ability to dispatch the right person to the exact location at the precise time, and only when needed, reduces or eliminates wasted time, by having context-based real-time information readily available. Enhanced automation can provide the information necessary to identify the problems or conditions at each location before action is taken. Personnel are better prepared to perform their duties, and in less time. Some of the many benefits that users can leverage through powerful tools within each platform for a more unified and efficient control over a facility include: multi-facility data acquisition, energy aggregation and analysis tools, enhanced control of heating, ventilation, and air conditioning (HVAC) systems to lower energy consumption, monitor and control of generators and critical backup systems, compare costs, study loads, and lighting trends, investigate power quality issues, improve power factor, manage energy consumption at key times of the day, identify hot spots and problem areas, and minimize electrical equipment investments on new projects, to name a few.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1A:
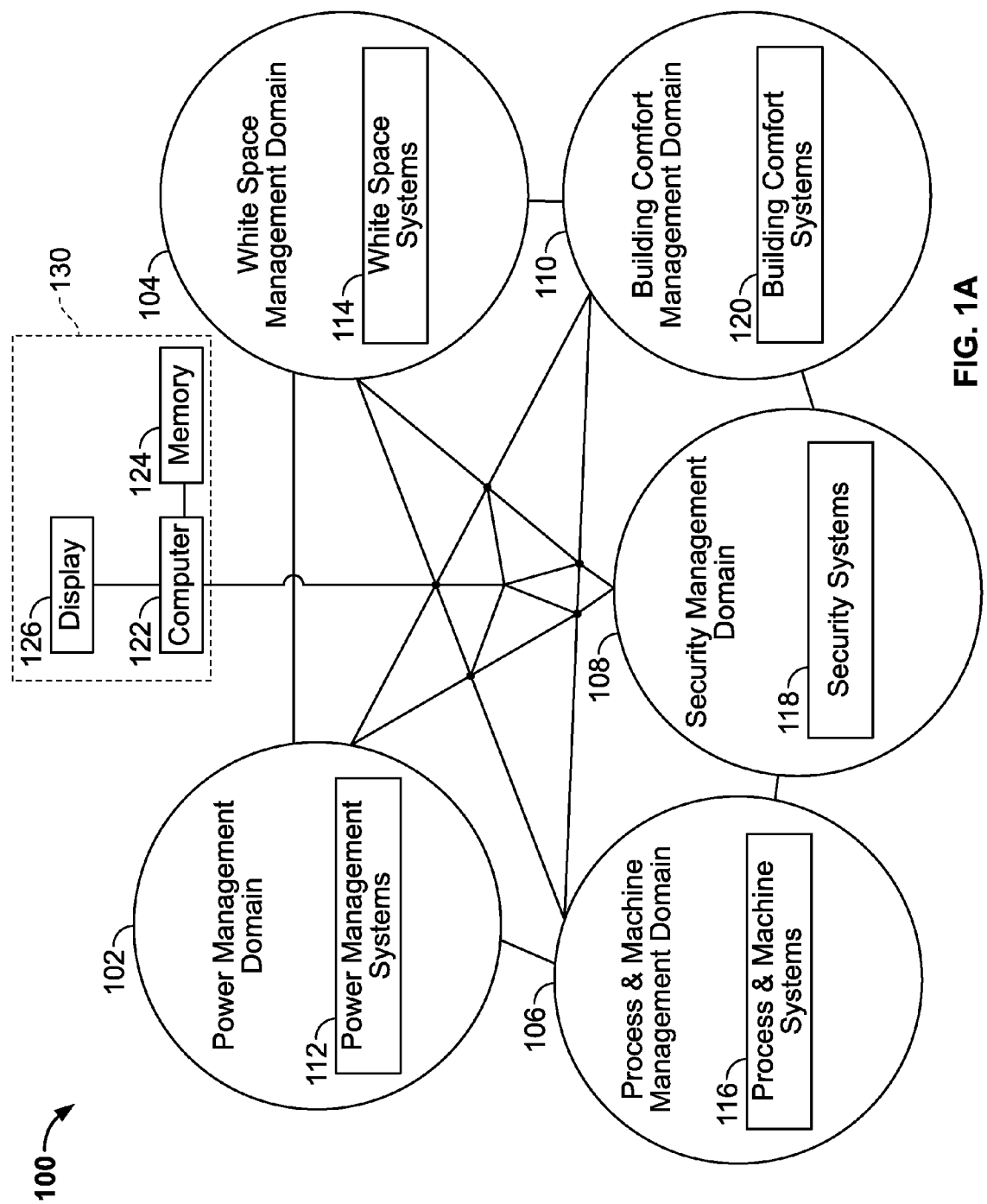
FIG. 1A is a functional block diagram of a data integration system that integrates data indicative of multiple sensed conditions received from any two or more management domains.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1A is a functional block diagram of a data integration system 100 that integrates data indicative of multiple sensed conditions received from any two or more management domains 102-110. Five management domains are specified, including in no particular order a power management domain 102, a white space management domain 104, a process and machine management domain 106, a security (and safety) management domain 108, and a building comfort management domain 110. Each of the lines interconnecting each of the domains to one another indicate data flow and communication paths for the exchange of data, information, and commands between multiple domains. Each domain 102-110 includes one or more systems related to the respective domain. The power management domain 102 includes power management systems 112, the white space management domain 104 includes white space systems 114, the process and machine management domain 106 includes process and machine systems 116, the security management domain 108 includes security systems 118, and the building comfort management domain 110 includes building comfort systems or building management systems (BMS) 120. Each of the systems 112-120 includes an arrangement of mutually related systems that each relates to the corresponding domain 102-110. For example, a power meter device would be logically related to the power management domain 102, whereas a security camera device would be logically related to the security management domain 108. A heating, ventilation, and air conditioning (HVAC) system would be logically related to the building comfort management domain 110, whereas a supervisory control and data acquisition (SCADA) system would be logically related to the process and machine management domain 106. A data center that includes a server or a wiring closet would be logically related to the white space management domain 114.

The power management domain 102 relates to, for example, power quality, energy savings or management, intelligent motor protection systems, medium voltage control, low voltage control, and renewables energy conversion. Automated supervision of these aspects is managed by a power and energy monitoring system, or a power SCADA system. The industrial or process and machine management domain 106 relates to, for example, continuous process, discrete process, general machine control, packaging, material handling, hoisting, and pump and fan control. Automated supervision of these aspects is managed by a process control (SCADA) system. The white space management domain 104 relates to, for example, power distribution units (PDUs), cooling, uninterruptible power supplies (UPS), surveillance, and environmental monitoring. Automated supervision of these aspects is managed by a white space monitoring system, an inventory management and workflow system, or a capacity simulation and modeling system. The building comfort management domain 110 relates to, for example, lighting, heating, ventilation, air conditioning, zone control, elevators, and escalators. Automated supervision of these aspects is managed by a building control system. The security (and safety) management domain 108 relates to, for example, access control, video surveillance, emergency lighting, and alarms. Automated supervision of these aspects is managed by a video surveillance system or an access control system.

Examples of power management systems 112 include an electrical monitoring and control system, an enterprise energy management system, a power monitoring or management system, an energy, carbon dioxide, and remote monitoring system, and an embedded web energy monitoring system. Examples of white space systems 114 include a power and cooling capacity management system, an energy manager system, a whitespace manager system, a whitespace environment and security system, and an inventory management system. Examples of process and machine management systems 106 include a manufacturing execution system, a collaborative control system, a SCADA system, and a configuration and programming system for programmable logic controllers (PLCs) and I/O devices. Examples of security systems 118 include a video system, a fire system, and an access system, such as a badge access system for gaining authorized entry into a building. Examples of building comfort systems 120 include an HVAC system, an energy reporting system, and an information technology (IT) integration system.

A building management system (BMS) includes at least an air conditioning unit or at least a server. It produces data indicative of at least one sensed condition (such as temperature) in a building that is managed by the building management system. The computer 122 automatically determines, based on data from the BMS and at least one other system in another domain, an action to be carried out by the BMS for controlling the air conditioning unit. A power monitoring system includes at least one power monitoring device that monitors an electrical characteristic of electricity (e.g., energy, power, current, voltage, frequency). In an example, the power monitoring device is coupled to a portion of a power distribution system that includes an air conditioning unit for the building. A process (or industrial) control system includes at least one fluid flow monitor in a non-limiting example, which produces data indicative of at least one sensed condition (e.g., fluid flow rate) in a fluid distribution system. The computer 122 automatically determines based on the data indicative of the sensed condition in the fluid distribution and based on data from another system in another domain an action to be carried out by the process control system for controlling the fluid distribution system, which optionally supplies a fluid to a building managed by a building management system.

One or more central computers 122 are communicatively linked to each of the domains 102-110 via a network and receive data from the systems 112-120 within each of the corresponding domains 102-110. Data from each system or domain is indicative of at least one sensed condition in the corresponding system. The sensed condition relates to a consumable resource, such as water, air, gas, oil, a mineral, energy, or electrical power. The sensed condition can represent a value, a status, a parameter, a characteristic, or other information about the consumable resource. The data received from each domain is stored in a memory 124. Information indicative of the received data is displayed on a conventional video display 126. Together, the computer 122, memory 124, and the display 126 comprise a computer system 130. Note that the memory 124 and the display 126 need not be physically near the computer 122, but rather may be remote from and operatively coupled to the one or more computers 122. In this example, the computer 122 can be located in any of the domains 102-110, or it can be located remotely from all of the domains 102-110. In this example, data from multiple domains is received centrally at the computer 122, which integrates the data and determines from the integrated data an action to be carried out.

Figure 1B:
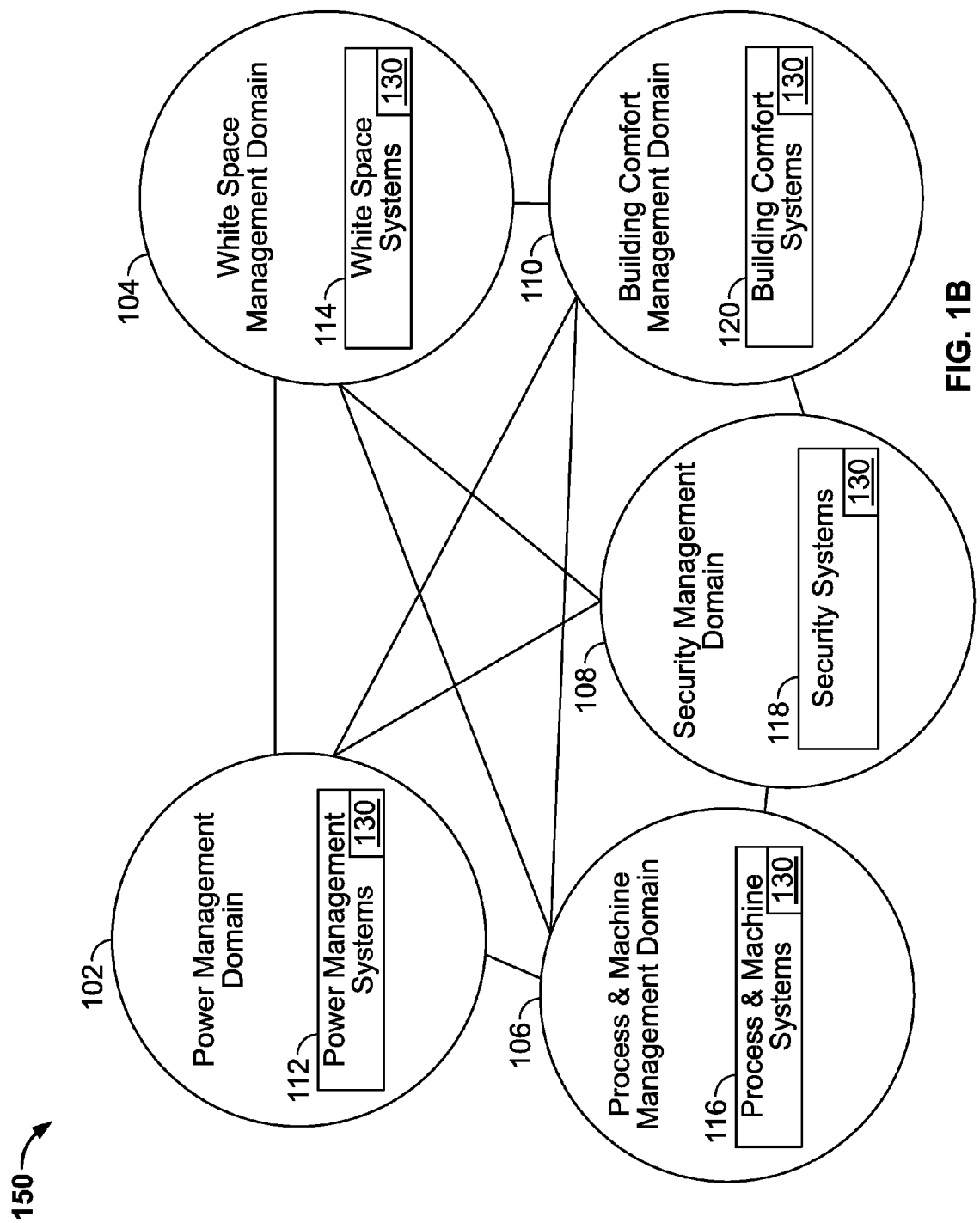
FIG. 1B is a functional block diagram of a data integration system that has the same management domains shown in FIG. 1A, except that the data integrated system of FIG. 1B is a distributed system in which each domain has its own computer system.

FIG. 1B is a functional block diagram of a data integration system 150 that has the same management domains 102-110 shown in FIG. 1A, except that the data integrated system 150 is a distributed system in which each management domain has its own computer system 130. Data indicative of multiple sensed conditions from each of the respective management domains is received at the corresponding computer system 130. This distributed system can be extended to all of the systems within a particular domain, such that each system has its own computer system like the computer system 130. All of the computer systems can communicate with one another using the same protocol and application interface as the devices within any particular system in any domain. Complete interoperability and compatibility is enforced at some or all levels of the systems and also at the inter-domain level.

Figure 2:
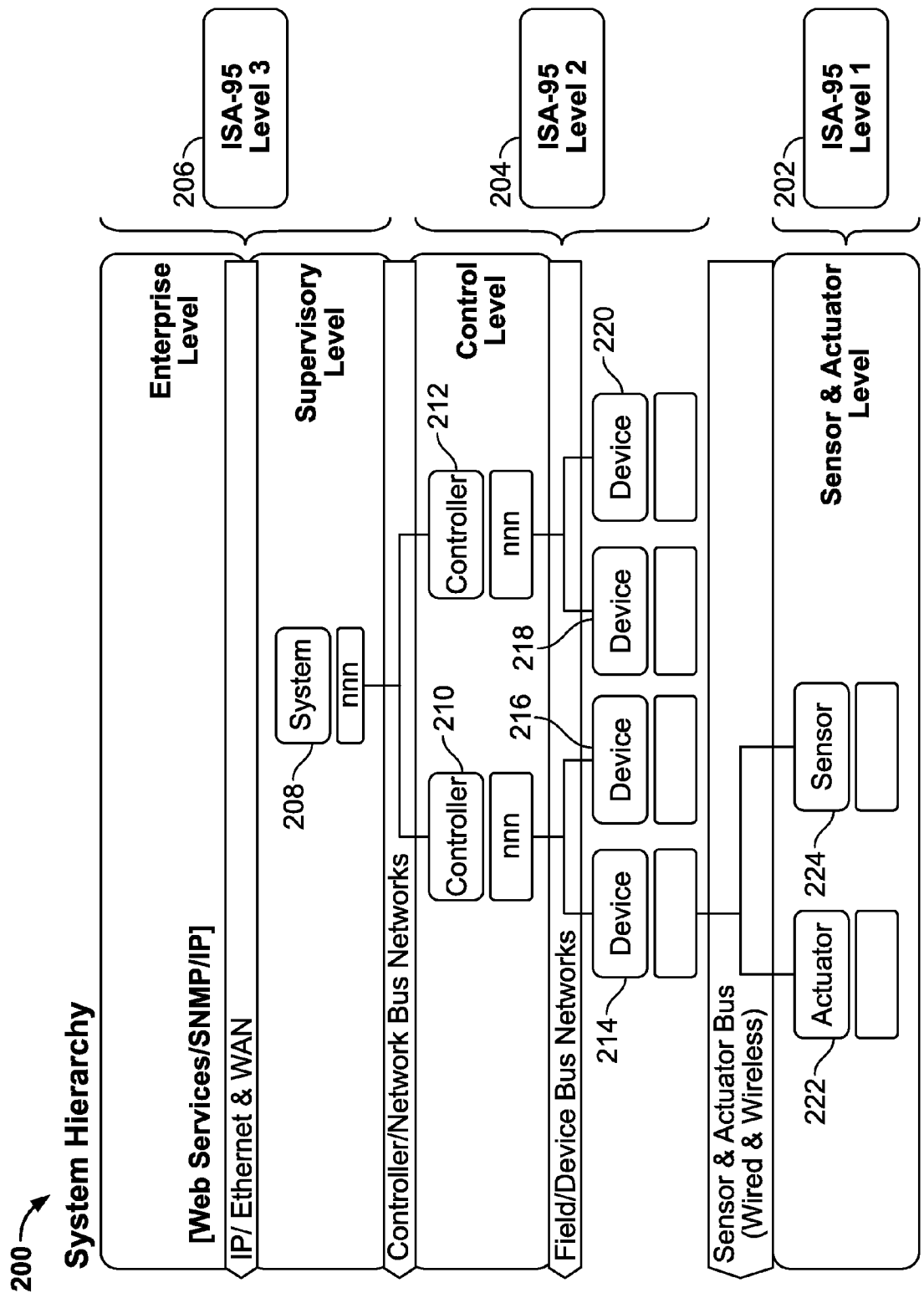
FIG. 2 is functional block diagram of a hierarchical architecture according to an aspect of the present disclosure.
Figure 3A:
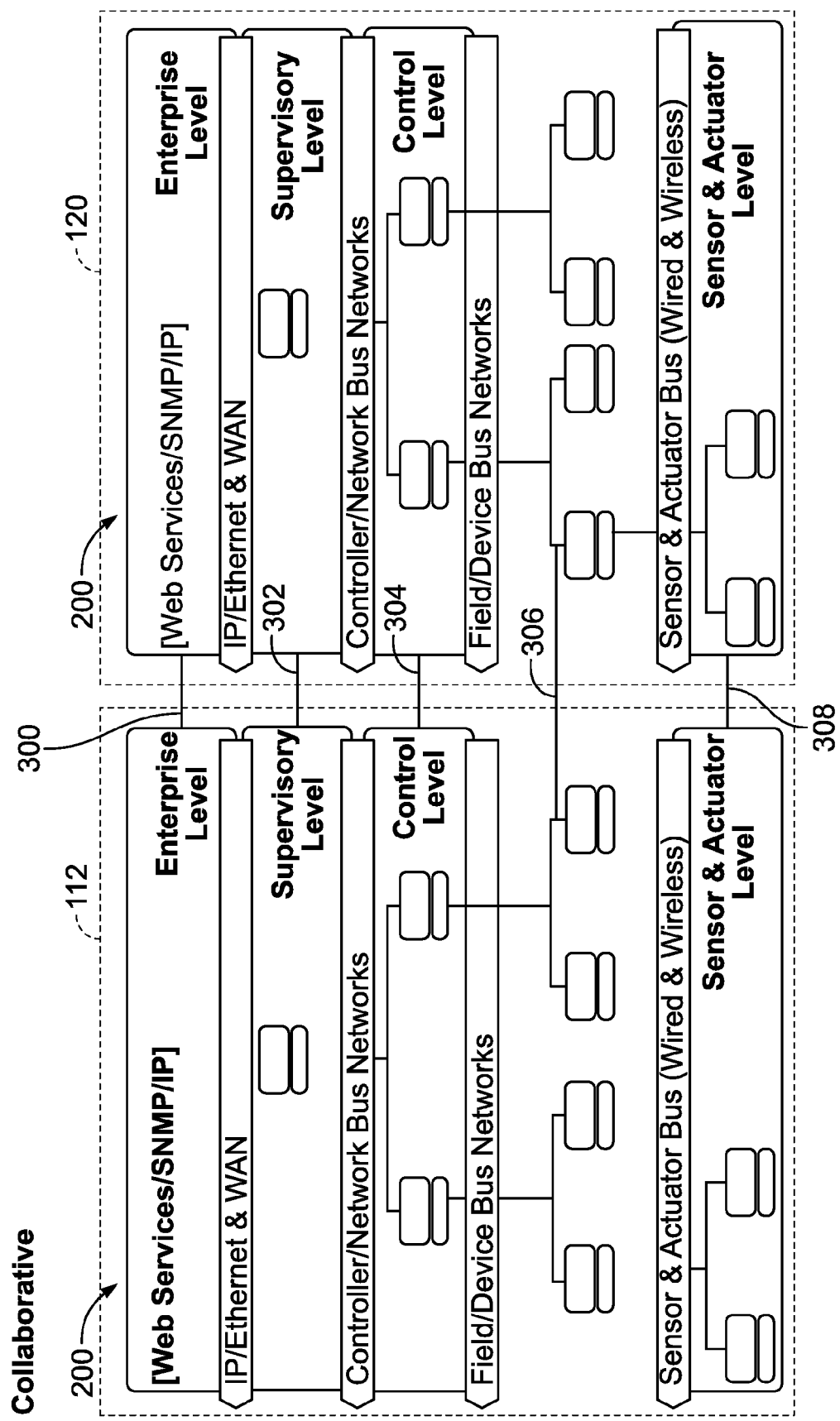
FIG. 3A is a functional block diagram of a collaborative architecture according to another aspect of the present disclosure.
Figure 3B:
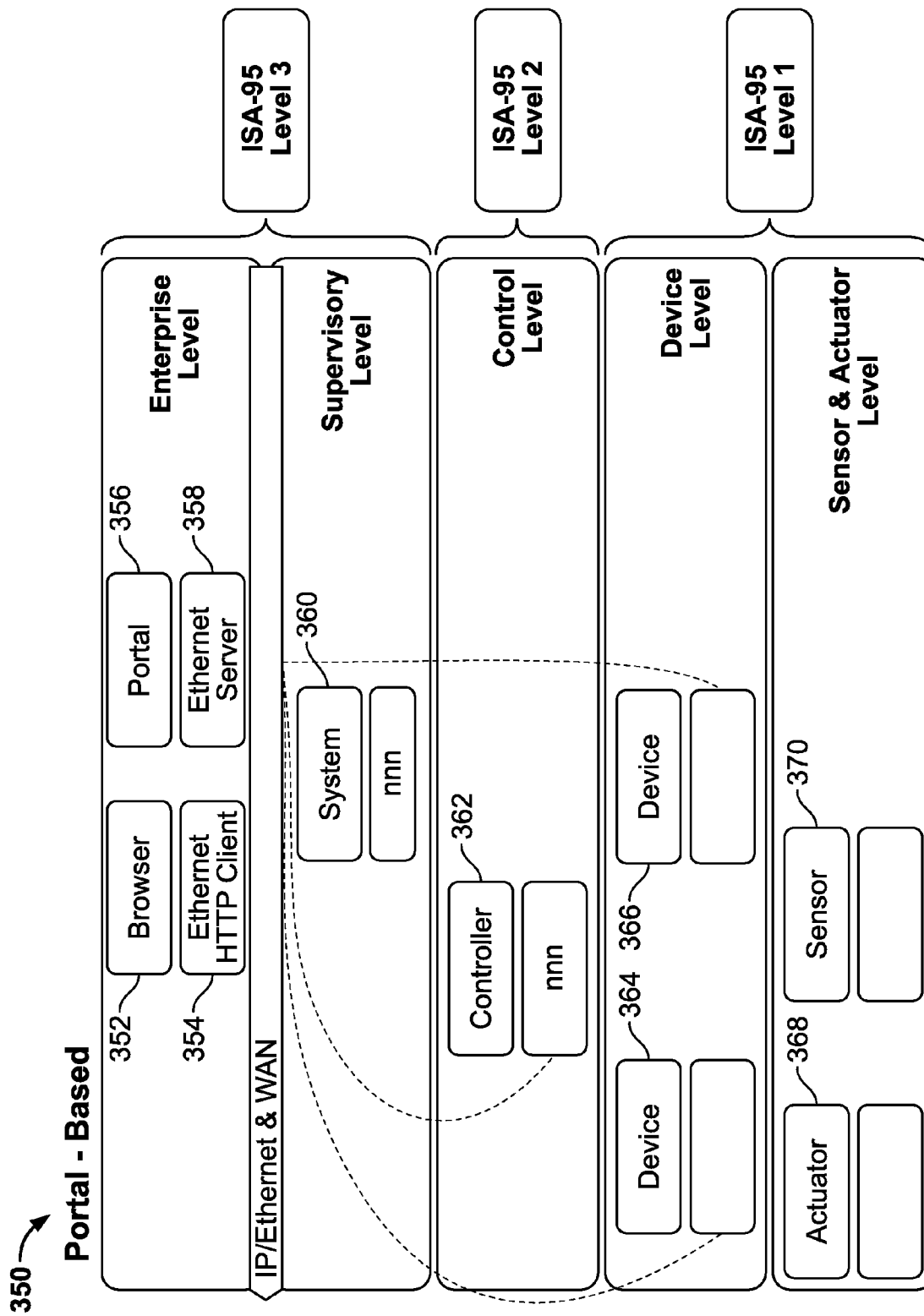
FIG. 3B is a functional block diagram of a portal-based architecture according to yet another aspect of the present disclosure.

As shown in FIG. 2, each system 112-120 conforms to a common system architecture 200 in a hierarchical format that defines how data is communicated among the various components within each system and how that data is formatted. The system architecture 200 shown in FIG. 2 is referred to as a "hierarchical" architecture. By contrast, FIG. 3A illustrates a "collaborative" architecture, and FIG. 3B illustrates a "portal-based" architecture. The system architecture 200 has a three-level topology that can be defined according to the ISA-95 standard and can be preferably modeled according to a Service Oriented Architecture (SOA). The ISA-95 standard defines terminology and a multi-level topology for enterprise systems and control systems, namely, a sensor and actuator level and a device level at level one 202, followed by a control level at level two 204, and a supervisory and an enterprise levels at level three 206. Each network-enabled device, component, or module 208-224 in a particular system 112-120 that conforms to the system architecture 200 is networked together and communicates data inside or outside the corresponding system according to the Internet Protocol (IP) or using web services. The data is formatted according to the same application interface. As used herein, an application interface includes at least two components: a services interface and a data interface. An example of a suitable services interface for a software application is web services. Examples of use of web services and software gadgets within a utility system are provided in commonly assigned U.S. patent application Ser. No. 12/215,734, entitled "Web Services Enabled Device and Browser Gadgets Coupled with Data Storage Service and Web Portal,", filed Jun. 30, 2008, the entirety of which is incorporated herein by reference. The present disclosure contemplates extending the implementations disclosed in the aforementioned patent application to any system in any management domain described herein. An example of a suitable data interface is the eXtensible Markup Language (XML) data exchange format. Each device or component can implement Device Profile for Web Services (DPWS) in its IP stack in a non-limiting example, though other web services can be implemented instead. DPWS defines a minimal set of implementation constraints to enable secure web service messaging, discovery, descripting, and eventing on resource-constrained devices. The IP network that manages the system uses a Simple Network Management Protocol (SNMP), which conventionally defines an application layer protocol, a database schema, and a set of data objects. A device in the context of the system architecture 200 at the device level is a dedicated apparatus that provides sensing, actuating, and/or processing capabilities. Examples of devices include sensors (e.g., temperature sensor), a physical actuator (e.g., a drive), and I/O devices. It should be emphasized that the term "device" has this meaning in the context of the device level of the system architecture 200 only. A general purpose apparatus, such as a computer, a network switch, a hub, a router, a PLC, a gateway, and the like are not considered a "device" at the device level of the system architecture 200. Rather, these apparatuses would be considered part of the higher levels of the system architecture 200, such as the control level or higher.

It should be emphasized that the system architecture 200 is applied consistently across each of the domains 102-110 and their corresponding systems 112-120 shown in FIG. 1A. This consistent application of a common system architecture 200 across all domains 102-110 of expertise facilitates mutual compatibility and consistency among the domains, guaranteed and seamless interoperability among the system components, a common connectivity implementation across multiple domains, system integration among multiple domains 102-110, enhanced functionality, reporting, trending, forecasting, and analysis stemming from a cross-domain perspective of multiple systems, data format standardization, cross-domain applications blending, and a common technical platform to which all system devices conform, among others. Interoperability refers to the ability of two or more systems or components to exchange information and to use the information that has been exchanged.

FIG. 3A is a functional block diagram of two common system architectures 200 in different and exemplary systems 112, 120 in different corresponding domains 102, 110, respectively. This architecture exemplifies a collaborative architecture, where different management domains can share data at or among any one or more levels in the hierarchy. Components at any level in the two system architectures 200 shown can exchange data according to the common protocols, data formats, and communications standards, and use a common application interface specified in the common system architecture 200 for both exemplary systems 112, 120. Links 300-308 illustrate cross-domain communication pathways for data and information between the different systems 112, 120. Data passed among the various domains 102-110 is communicated according to the same communications protocol (e.g., IP, web services) and formatted according to the same application interface (e.g., XML, web services).

Returning to the architectural diagram of FIG. 2, at the sensor and actuator level 202, the sensor 224 can include an analog sensor, a digital sensor, or an analog/digital sensor. In a power management system 112, such as a power monitoring system, these sensors can be associated with current or voltage transformers, I/O points, power/energy meters, or other sensors present in power management systems 112. At the device level 202 and in a power management system 112, the devices 214, 216, 218, 220 can include power meters, low voltage circuit breakers, medium voltage protection relays, motor protection and control, branch circuit monitors, and other devices present in power management systems 112. Each of these devices 214-220 communicate via IP and are Ethernet-enabled. At the control level 204, the system architecture 200 of the power management system 112 can include power meters, gateways, concentrators, programmable logic controllers (PLCs), and other control devices present in power management systems 112. Each of these control devices also communicate via the IP protocol and are Ethernet-enabled. At the supervisory level 206, the system architecture 200 includes application modules, web clients, thick clients, and servers.

Non-limiting examples of sensors and actuators include current transformers and sensor switches in power monitoring systems, pulse or analog non-electrical meters, badge readers in security systems, analog, digital, or IP cameras in security systems, fan coils or valves in building management systems 120, sensor switches in process management systems 116, or sensors and USB cameras in white space management systems 104. At the device layer, examples of devices include switchgear, metered circuit breakers, power meters, or meters with embedded modems in power monitoring systems, field devices or video capture/encoder devices in building management or security systems, and machine and field devices found in process management systems, uninterruptible power supplies (UPS), power distribution units (PDU), air conditioners, and other physical infrastructure in data centers. At the control layer, examples of control devices or components include trip units, medium voltage controllers, mid- to high-range meters, Ethernet gateways, remote terminal units (RTU) with analog and digital I/O, and relays in power monitoring systems, field controllers, network controllers, access controllers, room controllers, digital video recorders (DVR) in building management or security systems, machine control devices and process control devices in process management systems, and controllers, sensor managers, information technology (IT) servers with power management in white space management systems. At the supervisor layer, examples of components or modules include tenant billing software, power SCADA software, and power monitoring system software in power monitoring systems, building management system software in building management systems, security management software in security systems, process manager and SCADA software in process management systems, web client presentation portals and data center infrastructure manager in white space management systems. At the enterprise layer, examples of components or modules include enterprise energy management software executed by the computer 122, manufacturing execution system software executed by the computer 122, or a web client presentation portal presented at the computer 122.

FIG. 3B is a functional block diagram of a portal-based architecture 350 in which components at one level of the hierarchy can communicate with any device or component at any other consecutive or non-consecutive level in the hierarchy 350. In this example, the enterprise level includes a web browser component 352 coupled to an Ethernet HTTP client 354 and a portal component 356 coupled to an Ethernet server component 358. These enterprise components can communicate and share data with, for example, a controller 362 at the control level of the architecture 350, or with any one or more devices 364, 366 at the device level of the architecture 350 as shown by the dashed lines in the example. Likewise, the enterprise components or components at the supervisory or control levels can also communicate and share data with an actuator 368 or sensor 370 at the sensor and actuator level of the architecture 350. this portal-based architecture exploits cloud computing, as that term is understood by those familiar with computer networks, in which all software or objects self-declare within the cloud and can receive or request data from any other software or object within the cloud.

As mentioned above in connection with FIG. 1A, numerous domain integration combinations are contemplated involving two or more domains 102-110. The following exemplary domain combinations (and each domain's corresponding system combinations) are contemplated: (1) power management domain 102 and the process and machine management domain 106; (2) security management domain 108 and the process and machine management domain 106; (3) power management domain 102, building comfort management domain 110, security management domain 108, and white space management domain 104 at control and supervisory 204, 206 levels of the system architecture 200 for generic buildings, hospitals, and data centers (also called server farms); (4) power management domain 102 and process and machine management domain 106 for the mining, water, and oil and gas industry segments at the control, supervisory, and enterprise levels 204, 206 of the system architecture 200. In this disclosure, at least two specific examples will be addressed in detail: integration of a power monitoring system 112 with a building comfort system 120, which can be further integrated with a white space system 114, such as a data center or data center wiring closet; and integration of sever and wiring closet systems (e.g., with a building comfort system 120. Both of these integration examples can be further integrated with a security system 118.

Building and power systems integration increases the capabilities of existing systems and enhances automation. As functionality of the integration increases, so does control over power while maintaining or improving occupant comfort, satisfaction, security, and productivity. Typical data and information exchanged between a power monitoring system 112 and a building management system 120 within an integrated solution (e.g., integration of domains 102 and 110) include operational data, such as real-time voltages, currents, power (kW, kVAR, kVA), power factor and frequency, and alarming values, consumption data such as accumulated energy and peak demand, power quality data such as voltage, current harmonics, and voltage disturbances, trending and forecasting information such as graphical trends, and forecasts for selected parameters, and equipment status information.

Figure 4:
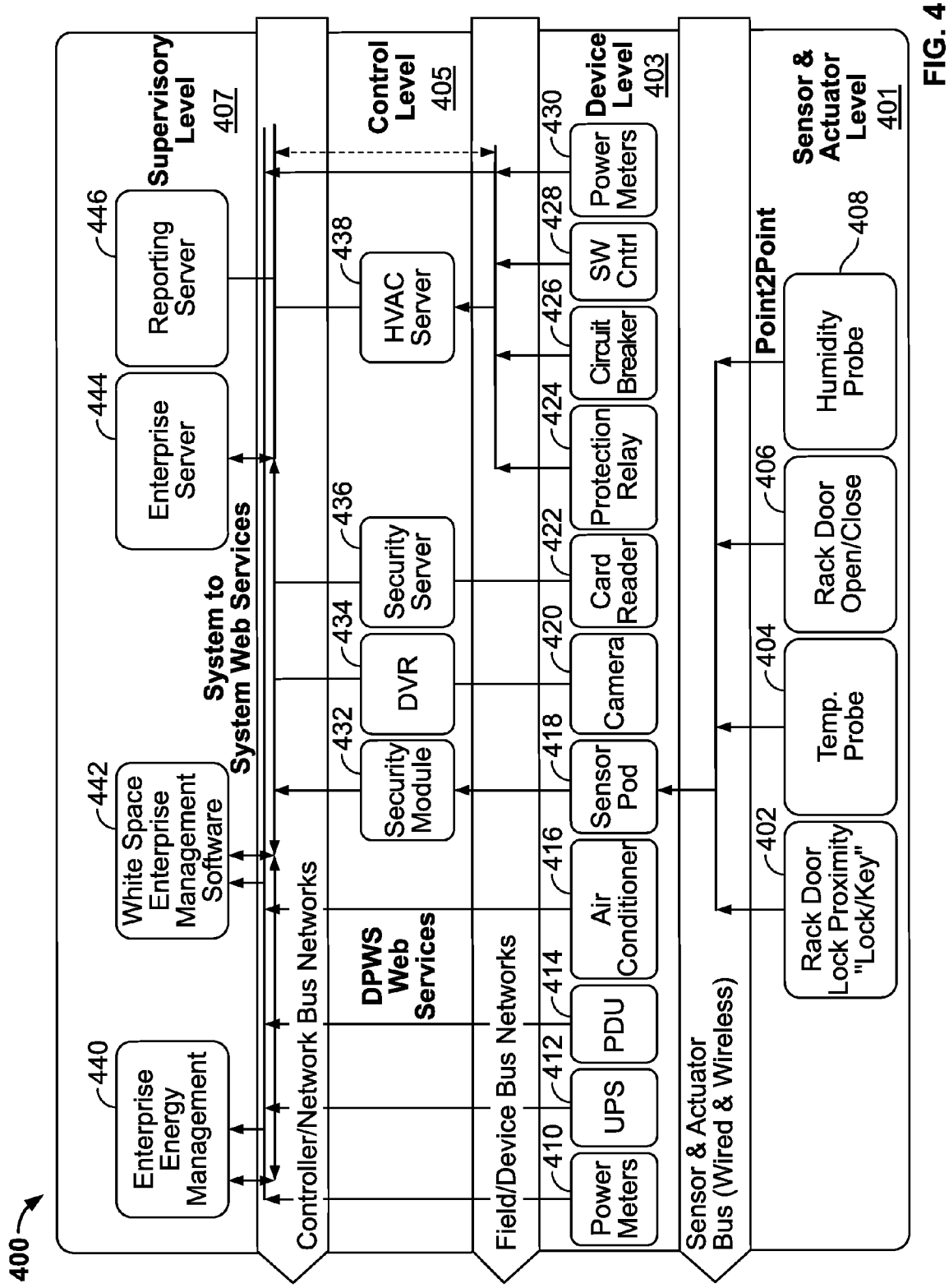
FIG. 4 illustrates an exemplary integrated architecture of a building management system, a white space management system, a security system, and a power management system.

FIG. 4 illustrates an integrated architecture of a building management system, a white space management system, a security system, and a power management system according to aspects disclosed herein. A number of example devices and components are shown that have traditionally been incorporated into different systems that were not integrated together. Some of the devices or components identified in FIG. 4 at the device, control, and supervisory levels communicate XML-formatted data using web services over IP. The devices and components are in different levels of the architecture, described in connection with FIG. 2, and can communicate with other devices or components at higher or lower levels of the architecture. Notably, as will be described later certain devices from different systems (e.g., building management system and power management system) at the device level can communicate directly with software components at the supervisory level.

At the sensor and actuator level 401, a number of devices 402-408 communicate via point-to-point connections with various devices at the device level 403. The devices include a rack door lock proximity sensor 402, a temperature probe 404, a rack door open/close sensor 406, and a humidity probe 408. These simple networked devices communicate via point-to-point connections to a sensor pod 418. Other networked devices at the device level 403 of the architecture 400 include a power meter 410, a UPS 412, a PDU 414 (typically found in a data center distributing power to a server rack in the data center), an air conditioner 416, a camera 420, an access card reader 422, a protection relay 422, a circuit breaker 426, a medium voltage switch controller 428, and a power meter 430. These devices are found in different systems from different domains. For example, the power meters 410, 430, the protection relay 424, and the circuit breaker 426 are members of a power monitoring system in a power management domain. The UPS 412, the PDU 414, and the sensor pod 418 are members of a data center system in a white space management domain. The air conditioner 416 is a member of a building management system in a building management domain. The camera 420 and the card reader 422 are members of a security system in a security management domain. The devices 410, 412, 414, 416, 430 can communicate their XML-formatted data directly with components at the supervisory level 407 over IP via DPWS web services.

At the control level 405, a security module 432, a digital video recorder (DVR) 434, a security server 436, and an HVAC server 438 receive data from the devices at the device level. The security module 432 can communicate its XML-formatted data to components at the supervisory level 407 over IP via DPWS web services. At the supervisory level 407, enterprise-level software components or modules unifies all of the data from the reporting devices and components and provides an integrated view of a complex physical infrastructure. These modules and components can include enterprise energy management (EEM) software 440, white space enterprise management software 442, an enterprise server 444, or a reporting server 446, for example.

A pioneering aspect of this disclosure is the integration of data centers (white space management systems) with building management systems, allowing any component that consumes electrical energy or produces or reduces heat energy to be controlled and managed centrally at the computer 122 as shown in FIG. 1A or in a distributed architecture as shown in FIG. 1B. Further integration with security systems and power systems allows seamless coordination among multiple domains to produce more effective and efficient operations and a streamlined and global perspective of an entire facility or campus. Monitoring heat in a data center is very important to preserve equipment integrity and avoid fires and other calamitous emergencies. Security monitoring creates awareness of intrusions into critical areas of a building and the integrity of a wiring closet. Facility operators can optimize staffing needs, enhance operator safety, avoid destructive calamities, and maintain centralized control over all assets in the facility. For example, an integrated solution that integrates building management, white space, power, and security systems in a coherent manner permits an operator at the computer 122 to monitor energy usage by a server in a data center, monitor intrusions into a wiring closet or access into the building, monitor temperature inside the data center and inside the building, and understand what amount of energy is being consumed by the air conditioning unit in a data center relative to the air conditioning units in the building.

The integration of white space and building management systems allows enterprise software to anticipate an increase in consumption of a consumable resource and to otherwise manage consumption of a consumable resource. For example, a data center can notify a building management system of a power load increase within the data center at a particular time of day, such as at 8 am on a workday. The building management system, in response to the notification from the data center of the power load increase within the data center, can anticipate an increased demand for chilled water, and makes additional capacity for chilled water, such as by activating a second chiller. As used herein, managing consumption of a consumable resource includes reducing such consumption, anticipating a change in a demand for the consumable resource, or otherwise adjusting a consumption of a consumable resource.

As used herein, a building can be a commercial office building, a retail center, an industrial building, or can be owned by a university or by a government. A data center can be a large enterprise data center, a large colocation center (or "colo"), or a small enterprise data center, or can include a data center "wiring closet," as that term is understood by those familiar with data centers.

Figure 5:
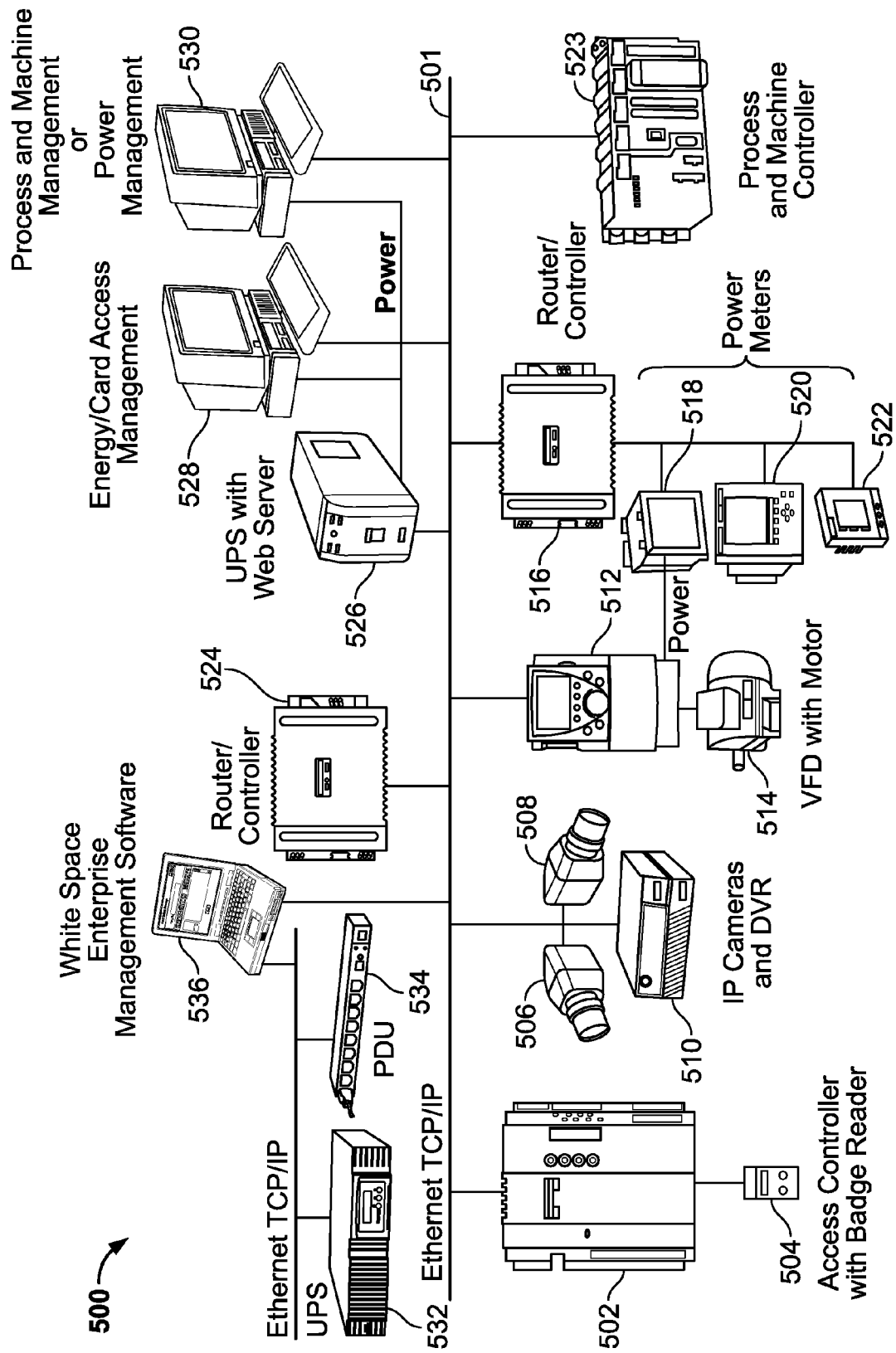
FIG. 5 illustrates an exemplary integrated system architecture combining devices and components from a power monitoring system, a security system, a white space system, a building management system, and an industrial system.

FIG. 5 illustrates an exemplary integrated system architecture 500 combining devices and components from a power monitoring system, a security system, a white space system (e.g., a data center), a building management system, and an industrial (process and machine) system. The devices are communicatively coupled to an Ethernet TCP/IP network 501 and transmit over the network 501 XML-formatted data indicative of a sensed condition in their respective systems. The following description of the devices include their corresponding domain in parentheses). The devices include an access controller 502 with a badge reader 504 (building management), IP cameras 506, 508 (security), a DVR 510 (security), a variable frequency drive (VFD) 512 and motor 514 (building management), a network controller 516 (building management), such as the Continuum bCX1 controller available from APC, power meters 518, 520, 522 (power monitoring), and a process and machine controller 523 (process and machine/industrial). The power meter 518 monitors electrical characteristics (e.g., current, voltage, power, frequency) of the VFD 512. Supervisory-level components or modules are also communicatively coupled to the TCP/IP network 501. These include a network controller 524 (building management), a UPS with embedded web server 526 (white space), an energy/card access management software 528 (building management), a process and machine or power management software 530 (process and machine or power monitoring), a UPS 532 (white space), a PDU 534 (white space), and white space enterprise management software 536 (white space). The software 528, 530, 536 can be stored in the memory 124 and executed by the one or more computers 122, which can be powered by the UPS 526 during a loss of mains power.

The next several figures are exemplary screens of the video display 126 from FIG. 1A or 1B. The screen depict various areas that can be developed as platform-independent software web "gadgets" or GUI widgets as those terms are understood by those skilled in the art of web software development.

Figure 6:
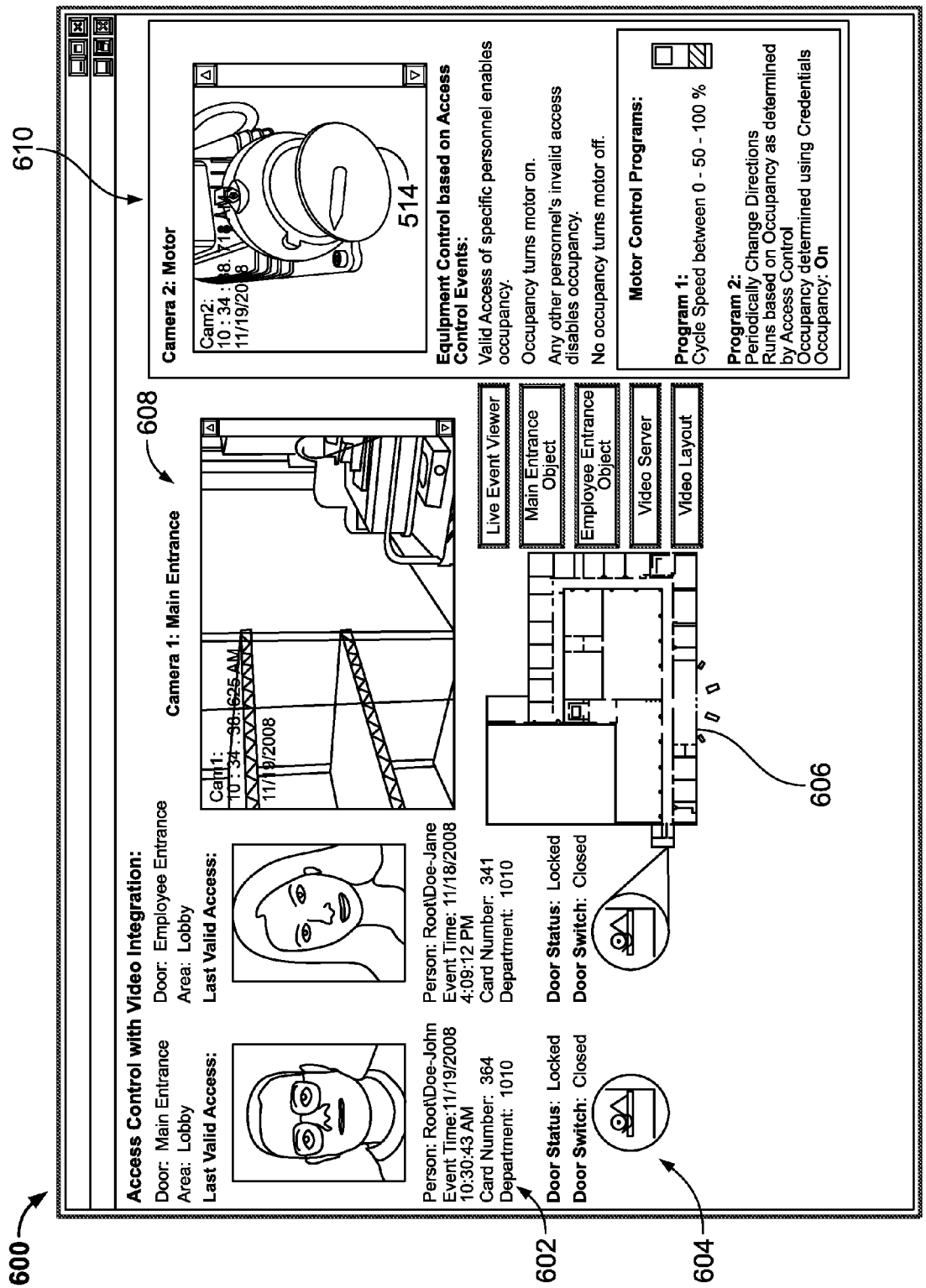
FIGS. 6-10 illustrate different exemplary screens displayed on a video display displaying video images indicative of the XML-formatted data received from some of the devices shown in FIG. 5 using web services.

FIG. 6 illustrates an exemplary screen 600 displayed on a video display, such as the display 126, displaying video images indicative of the XML-formatted data received from some of the devices shown in FIG. 5 using web services. The screen 600 includes a personnel access area 602, a door status indicator area 604, a building layout 606, a first camera area 608, and a second camera area 610. The personnel access area 602 displays data indicative of badge reader information received by the badge reader 504. A photograph of the personnel, the name, date and time of access, and other identifying information are displayed in the personnel access area 602. The door status indicator area 604 includes a status indication (locked and closed) of two doors in the building depicted in the building layout 606. The building layout 606 is supplied by the building management system, and shows the status of one of the doors in the door status indicator area 604. The first camera area 608 shows a video image of a main entrance to a data center in the building 606 as recorded by the camera 506. The screen 600 also shows a video image of the motor 514 recorded by the camera 508 along with a control adjustable by the operator for adjusting the cycle speed of the motor. This screen 600 integrates primarily the security (cameras) and building management (access control, motor) domains.

Figure 7:
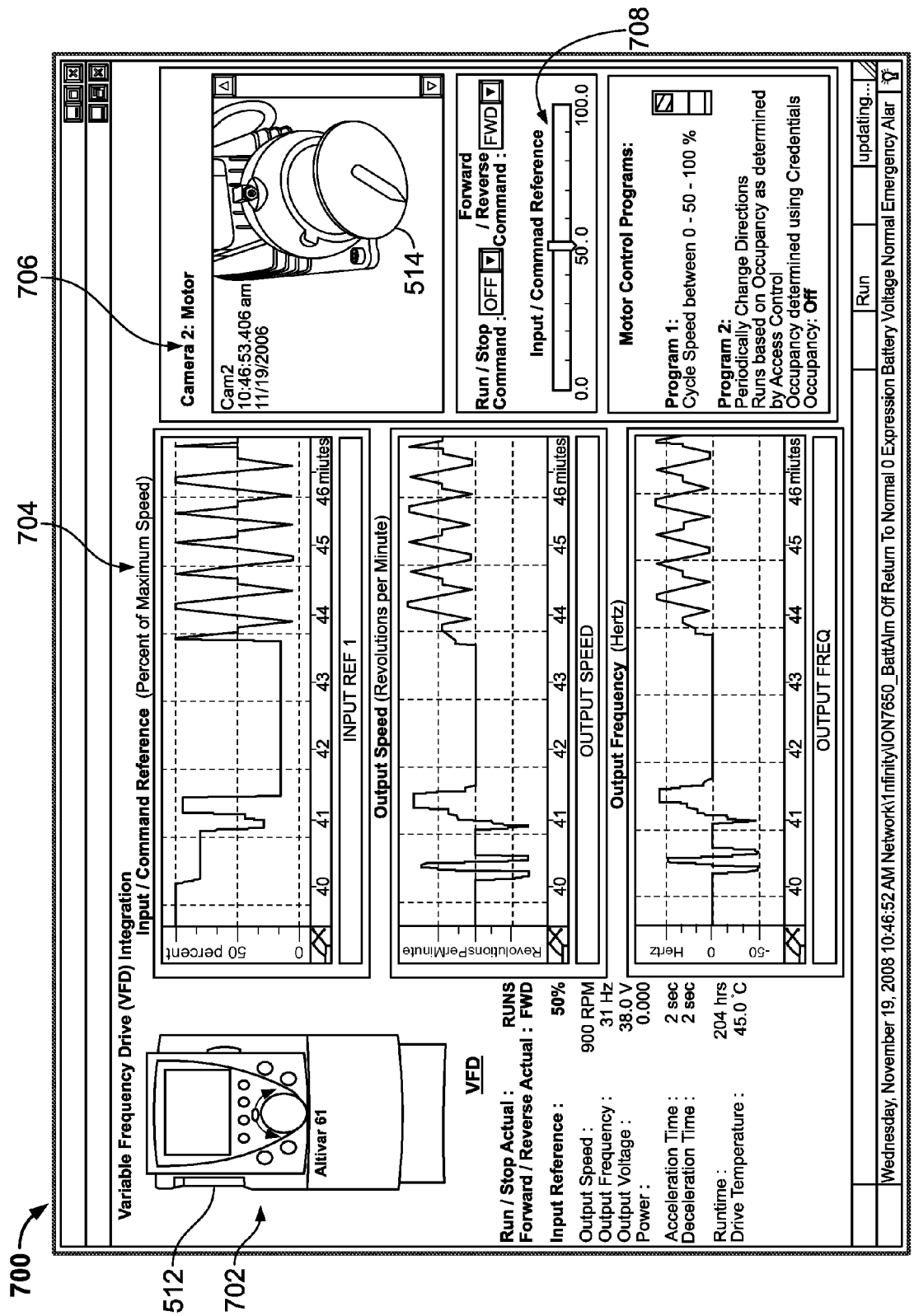

FIG. 7 is an exemplary screen 700 displaying video images indicative of XML-formatted data received from some of the devices shown in FIG. 5 using web services. The screen 700 includes a VFD information area 702, a VFD input/output chart area 704, a camera area 706, and an operator control area 708. The VFD information area 702 displays operational information about the VFD 512. This data is supplied to the computer 122 in XML format using web services over IP. The VFD input/output chart area 704 displays real-time charts of an input to the VFD 512 and its output speed and output frequency. The operator control area 708 allows the operator to control directly an input to the motor 514 and to adjust parameters of the motor, such as the cycle speed and direction. The camera area 706 displays real-time video images of the motor 514 as recorded by the camera 508. This screen 600 integrates primarily the security (camera) and building management (VFD) domains.

Figure 8:
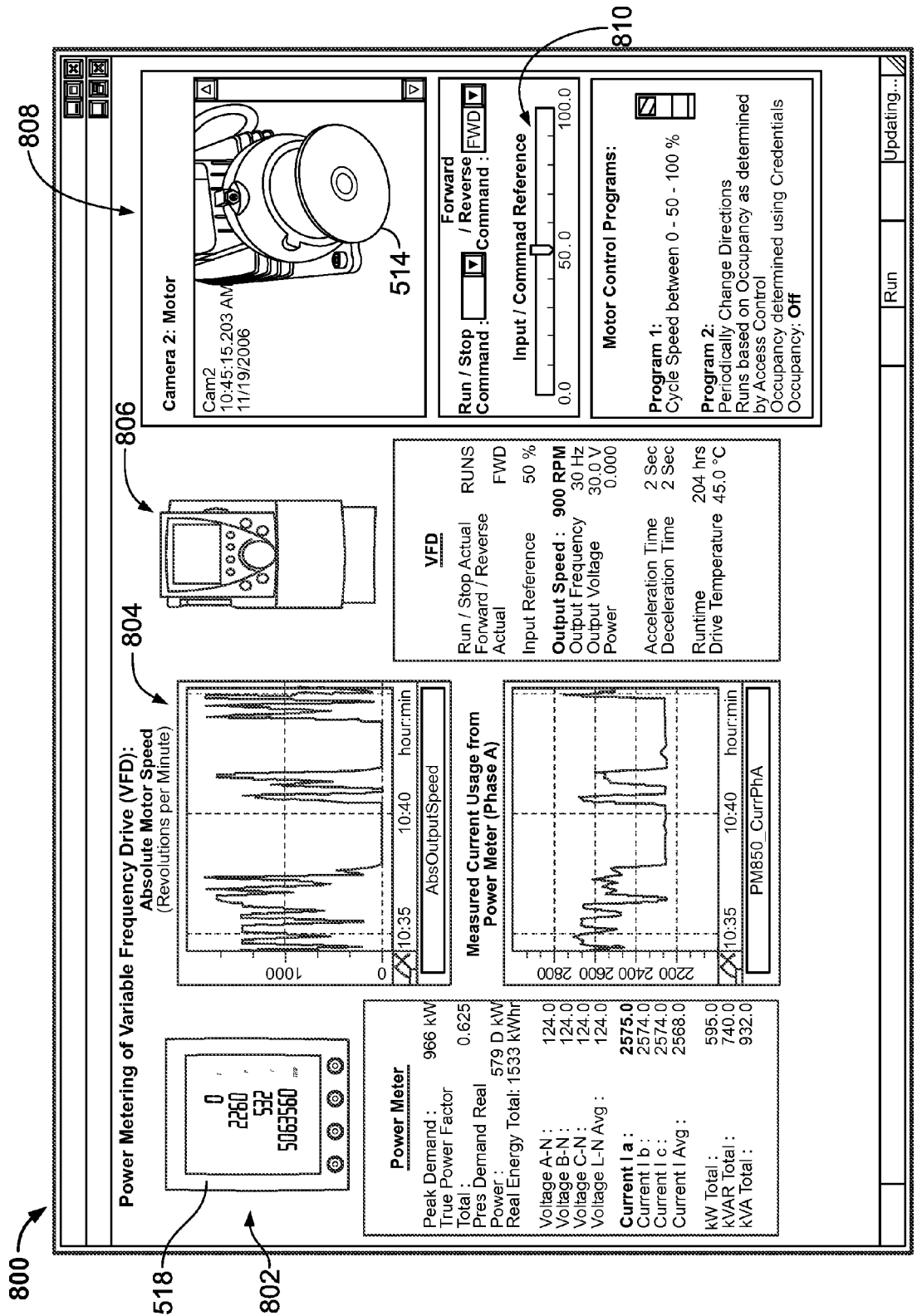

FIG. 8 is an exemplary screen 800 displaying video images indicative of XML-formatted data received from some of the devices shown in FIG. 5 using web services. The screen 800 includes a power meter information area 802, a motor information area 804, a VFD information area 806, a camera area 808 that displays real-time video images of the motor 514 as recorded by the camera 508, and an operator control area 810. The power meter 518 monitors the current usage, among other characteristics, by the VFD 512 and the real-time current usage measured by the power meter 518 is displayed as a chart in the motor information area 804 along with the absolute motor speed of the motor 514. The VFD information area 806 displays information about the VFD, such as its cycle duty, output speed, output frequency, and drive temperature. The operator control area 810 allows the operator to control an input to the motor 514 and to adjust parameters of the motor, such as the cycle speed and direction. This screen 800 integrates the power monitoring (power meter), building management (VFD, motor), and the security (camera) domains.

Figure 9:
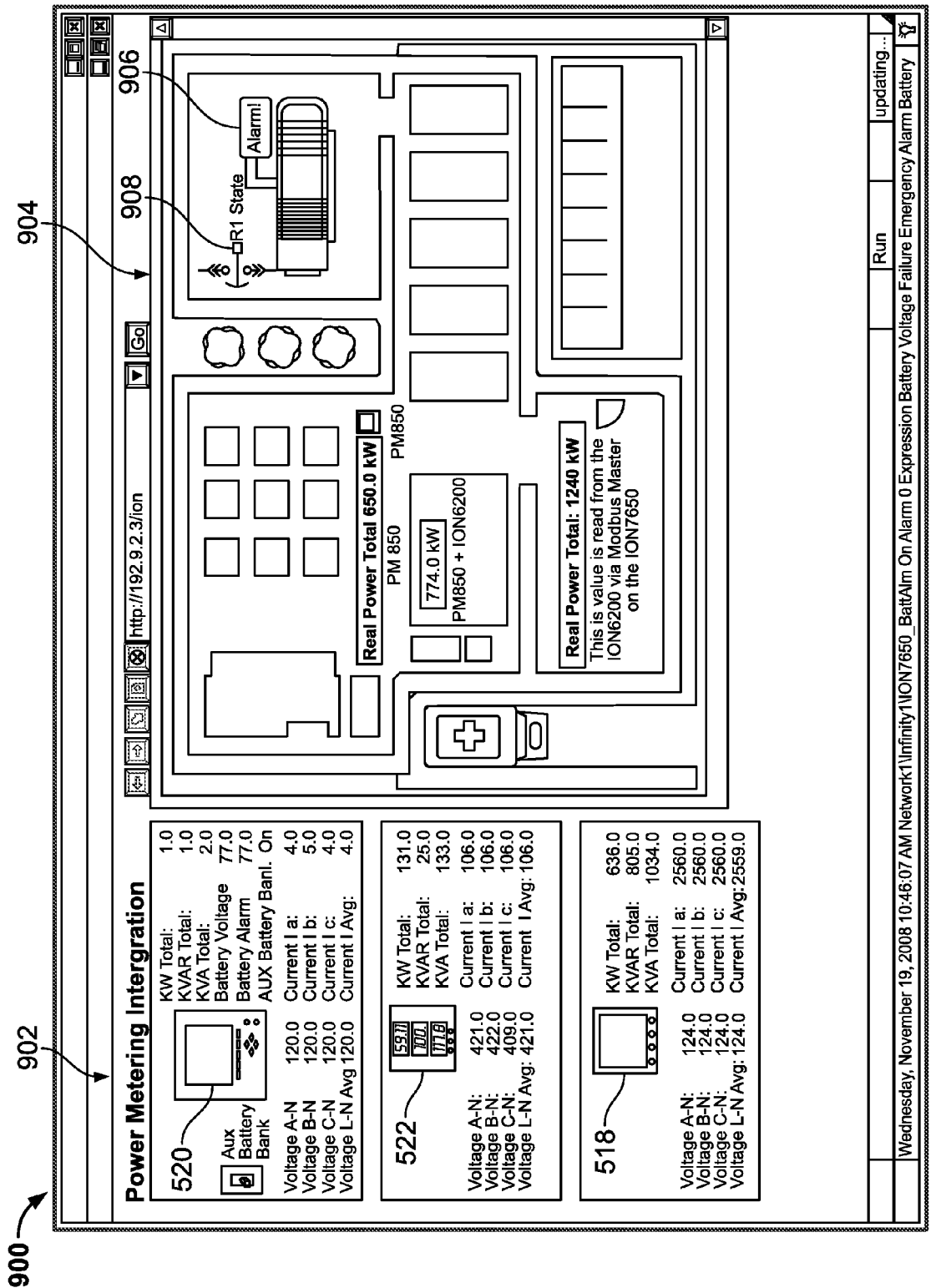

FIG. 9 is an exemplary screen 900 displaying video images indicative of XML-formatted data received from some of the devices shown in FIG. 5 using web services. The screen 900 includes a power meter information area 902 supplied by the power meters 518, 520, 522 in a power monitoring system and a building layout 904 supplied by a building management system. In this example, someone has adjusted a potentiometer 908 resulting in an alarm 906, which is graphically displayed to the operator along with the location of the alarm in the building layout 904. This screen 900 integrates the power monitoring (power meter) and security (alarm) domains.

Figure 10:
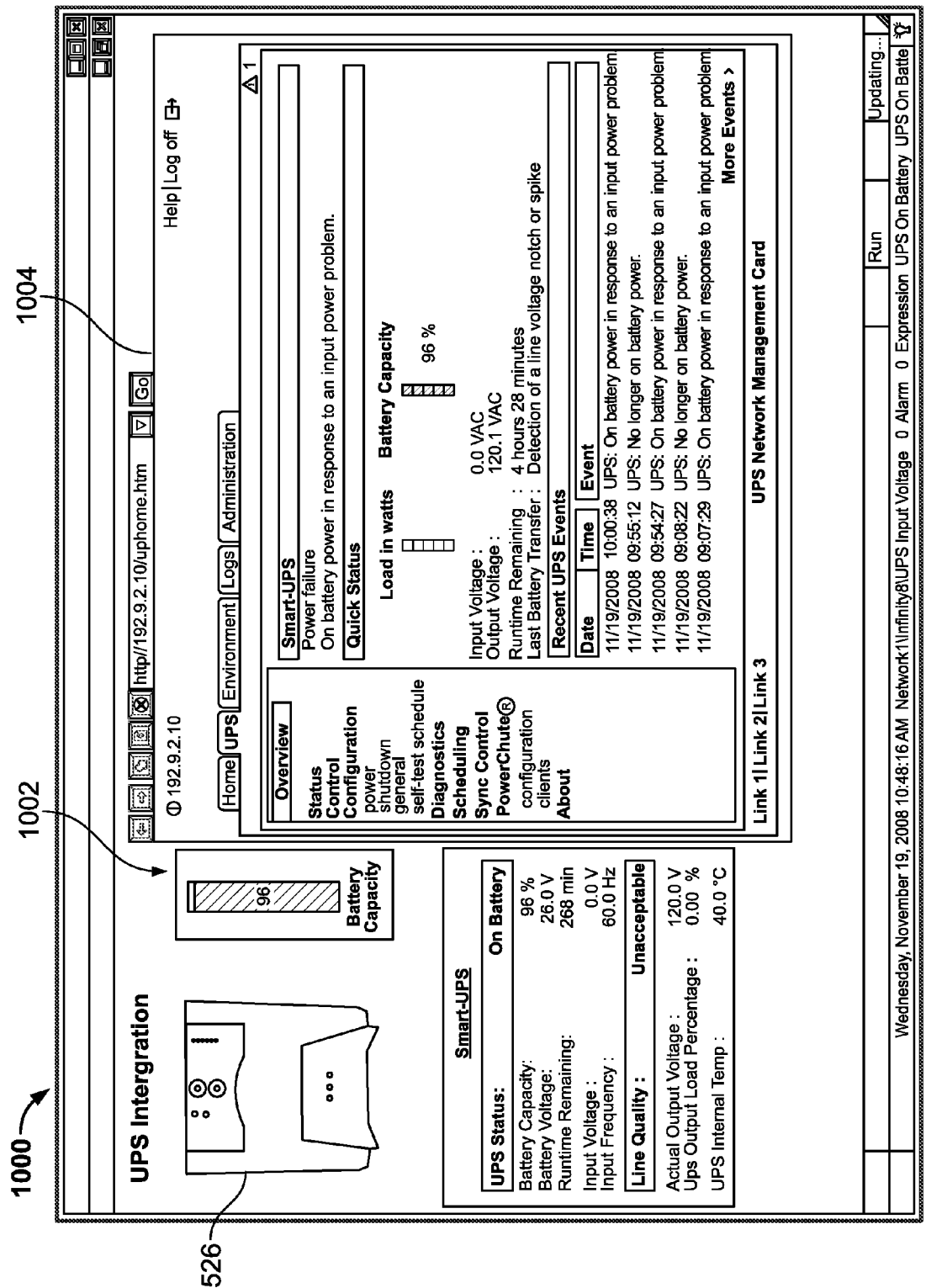

FIG. 10 is an exemplary screen 1000 displaying video images indicative of XML-formatted data received from some of the devices shown in FIG. 5 using web services. The screen 1000 includes a UPS information area 1002 and a UPS event area 1004. The UPS information area 1002 displays information about the status of the UPS 526 (in this example, the UPS 526 is operational due to a problem with the input line power) and information about the line quality as reported by a main meter. The UPS event area 1004 displays a log of recent UPS-related events and information about the remaining battery capacity and the anomaly that triggered the last transfer of power to the UPS. This screen 1000 integrates the power monitoring (main meter) and white space (UPS) domains.

It should be emphasized that the exemplary screens shown in FIGS. 6-10 and the exemplary architecture shown in FIG. 5 are just one of many numerous examples that can be implemented using the integrated approach disclosed herein. In addition to data centers and buildings (such as hospitals, hotels, and office buildings) described herein, other industries and applications can benefit from the integrated approach, including petrochemical (oil and gas) plants, mining or mineral systems, and water systems. As seen from the above examples, a power meter's data can be read by a security system or a building management system, because a common protocol and application interface is enforced on all reporting devices in all domains. The integration of power meters into domains outside of power management systems allows the enterprise software to find energy savings opportunities in any domain and to make appropriate recommendations. For example, a customer may spend 30% of the total energy bill on powering the data center, but only 10% of the total energy is actually consumed by the data center. The integrated solution disclosed herein allows the enterprise software to find inefficiencies in energy consumption and distribution, and make recommendations that will narrow the gap between energy spending and energy usage. Here, technology alone through integration of multiple domains drives the energy savings. Inefficiencies abound in today's devices, but what is offered herein is a solution that can be implemented immediately as devices and energy delivery infrastructures are optimized for energy savings.

Figure 11:
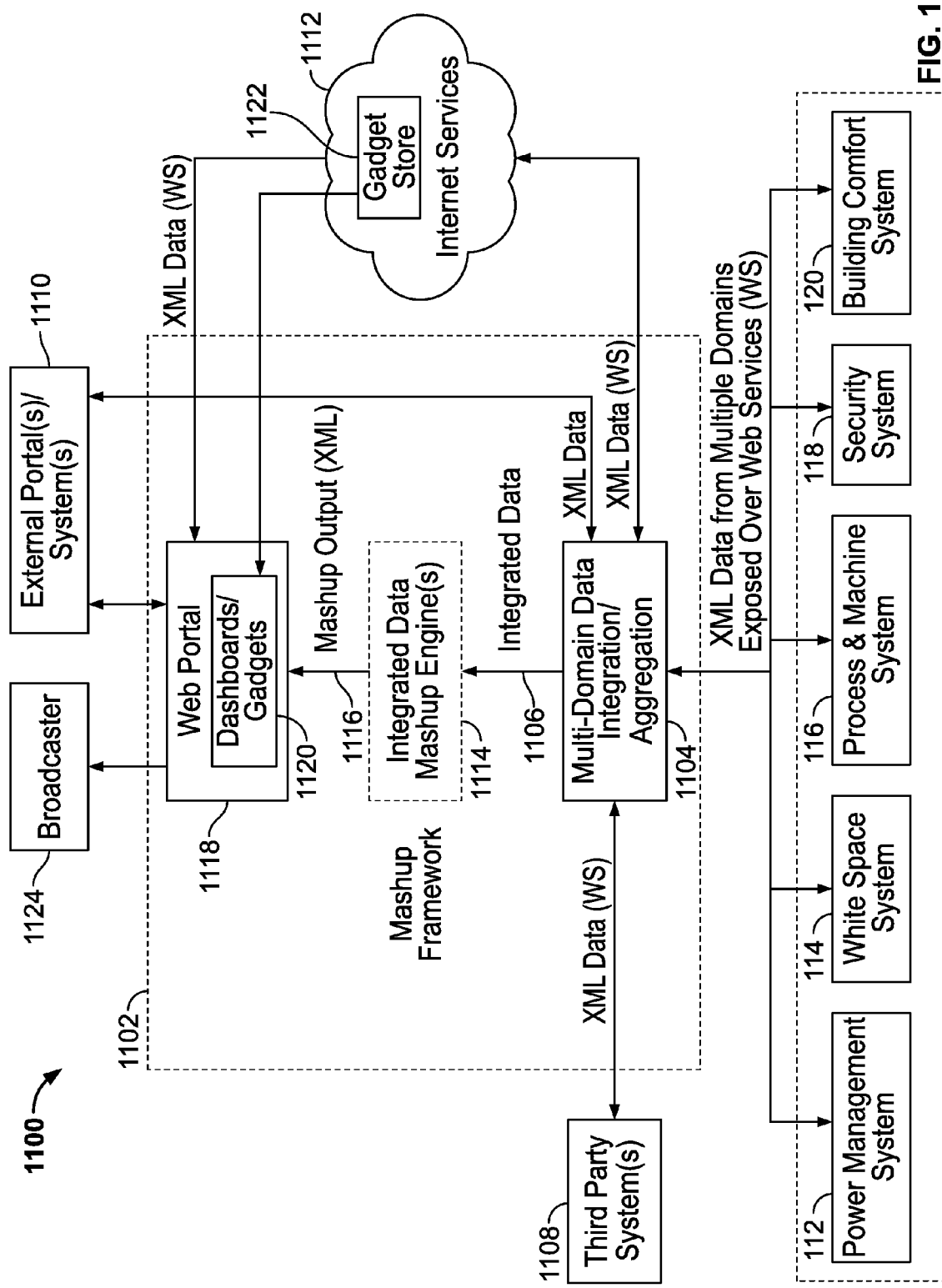
FIG. 11 illustrates a functional block diagram of a data integration system that receives data from any two management domains shown in FIG. 1A, mashes the two or more sets of data together and transforms the integrated data into a mashup output using a mashup engine for display on a web portal.

FIG. 11 illustrates a functional block diagram of a data integration system 1100 that receives data from any two management domains shown in FIG. 1A, mashes the two or more sets of data together and transforms the integrated data into a mashup output using a mashup engine for display on a web portal or other systems. The data integration system 1100 includes a mashup framework 1102. The mashup framework 1102 is a framework, as that term is understood by computer programmers, that uses mashup, as that term is understood by web developers, which is defined as a web page or web application that combines data from two or more external sources to produce a new service that is not provided by either external data source. The mashup framework 1102 includes a multi-domain data integration/aggregation module 1104, which receives data in XML format from at least two different systems 112, 114, 116, 118, 120 from respective ones of the five domains 102, 104, 106, 108, 110 shown in FIG. 1A. Each of the systems 112, 114, 116, 118, 120 expose their respective data over Web Services (WS), and the data is formatted using XML. The data integration/aggregation module 1104 mashes the two data sets together using conventional mashup techniques. The respective data exposed by the systems 112, 114, 116, 118, 120 is indicative of a sensed condition related to a consumable resource such as water, air, gas, oil, a mineral, energy, or electrical power.

A key to this aspect of the present disclosure is that the data integration/aggregation module 1104 receives data in a common format (e.g., XML) exposed by two different domains (as defined above) over Web Services, and mashes those two data sets together to produce an integrated data 1106 at its output. Heretofore, no known system has aggregated XML data from disparate domains (e.g., power management, white space management, process and machine management, security management, or building comfort management) exposed over Web Services to produce an integrated data set 1106 that can be transformed to provide relevant, contextual information across multiple domains to the end user.

The integration/aggregation module 1104 can also receive XML data from other sources, including third party systems 1108, an external portal or system 1110, and/or Internet services 1112. These sources 1108, 1110, 1112 of data expose their data over Web Services in XML format. The integration/aggregation module 1104 mashes data from at least two systems 112, 114, 116, 118, 120 in disparate domains 102, 104, 106, 108, 110 and optionally from one or more of the additional sources 1108, 1110, 1112 to produce integrated data 1106 that is provided to an optional one or more integrated data mashup engine(s) 1114. The mashup engine 1114 in general transforms the integrated data by producing a mashup output 1116 in XML format comprising data that cannot be obtained from each respective original source independently. Examples of the data transformation that occurs by the mashup engine 1114 are provided below. In general, the mashup engine 1114 is an application or program that transforms the integrated data 1106 into an output that is not possible from the originating sources of data alone.

The mashup output 1116 is provided to a web portal 1118, which displays information indicative of the mashup output 1116 as one or more video images on the web portal 1118. The web portal 1118 optionally includes a dashboard containing one or more software gadgets 1120, as that term is understood by computer programmers, which can be downloaded from a gadget store 1122 available from an Internet service 1112. The web portal 1118 can also provide some or all of its output to an external broadcaster 1124, such as a video display with a touchscreen, located in a lobby of a building, for example.

Figure 12:
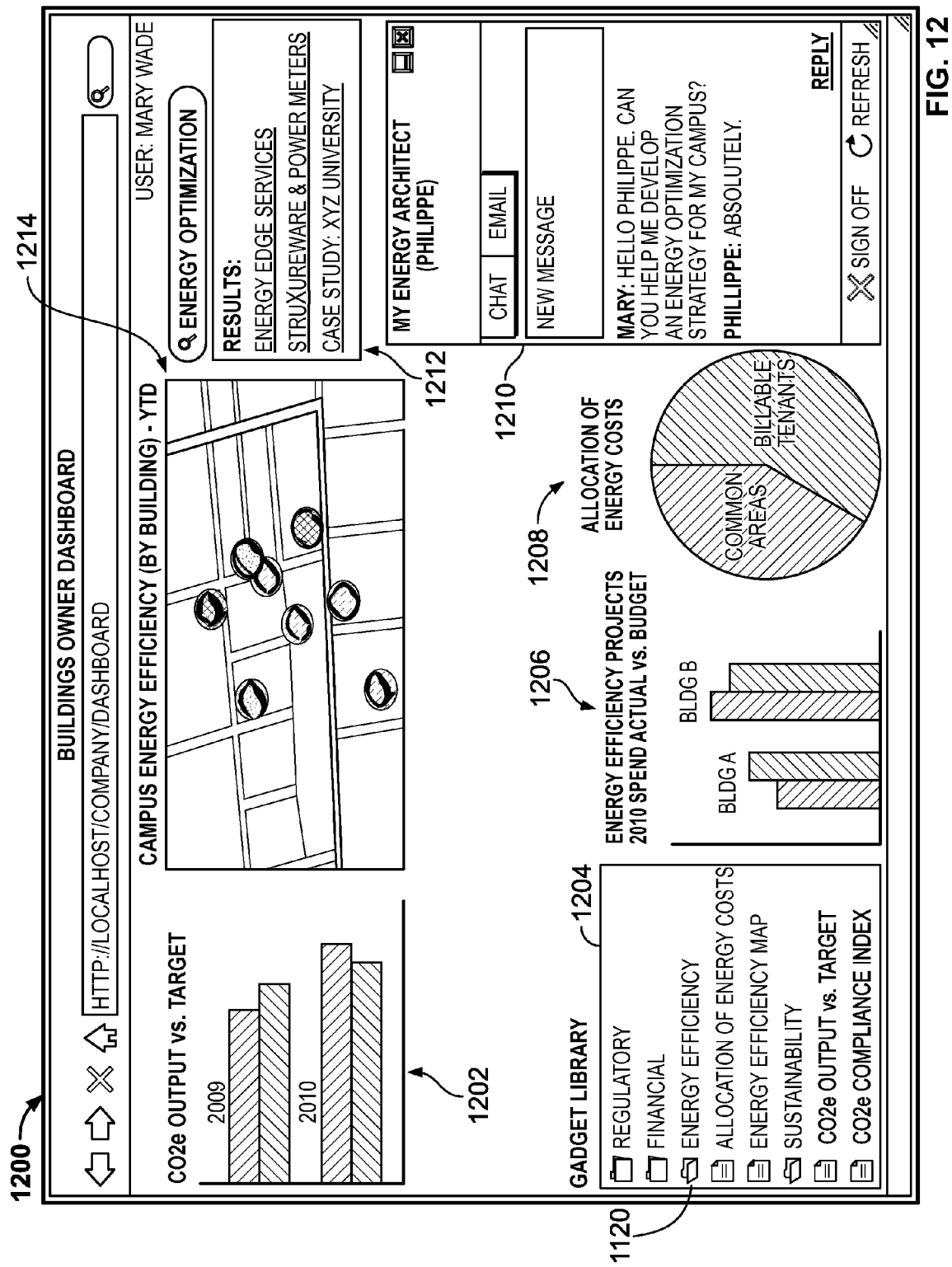
FIG. 12 is an example display of a portal used by a building owner showing gadgets and other information based on data received from multiple sources.

FIG. 12 is an example display 1200 of a web portal 1118 shown in FIG. 11, including gadgets 1120 and mashup outputs 1116 produced from data aggregated from various sources. This example portal display 1200 is one that might be accessed by a building owner and aggregates content from various sources and displays information relating to that content in different areas of the web portal 1118. The portal display 1200 organizes various modules for display to and interaction by the user. A first module 1202 that graphically displays actual carbon dioxide emissions output versus target output levels is based on mashed data aggregated from at least two systems 112, 114, 116, 118, 120. A gadget library module 1204 on the portal display 1200 is a dashboard constructed from a library of gadgets 1120 downloaded from the gadget store 1122 available from an Internet service 1112. An energy efficiency comparison module 1206 provides a summary of actual and budgeted expenditures from a third party system 1108. An energy cost module 1208 provides a high-level allocation of information from at least two systems 112, 114, 116, 118, 120. A chat gadget 1210 facilitates communications from the building owner to an expert using an Internet service 1112. A search engine module 1212 provides results from an Internet service 1112. An energy efficiency map module 1214 mashes data from one or more systems 112, 114, 116, 118, 120 and data from an Internet service 1112 to produce a map showing energy efficiency by building on a campus. Data of energy utilization is provided by, for example, the power management system 112, and mashed with map data provided by an Internet service, to produce a graphical representation of energy efficiency of each building in a campus at a glance and in real time.

Figure 13:
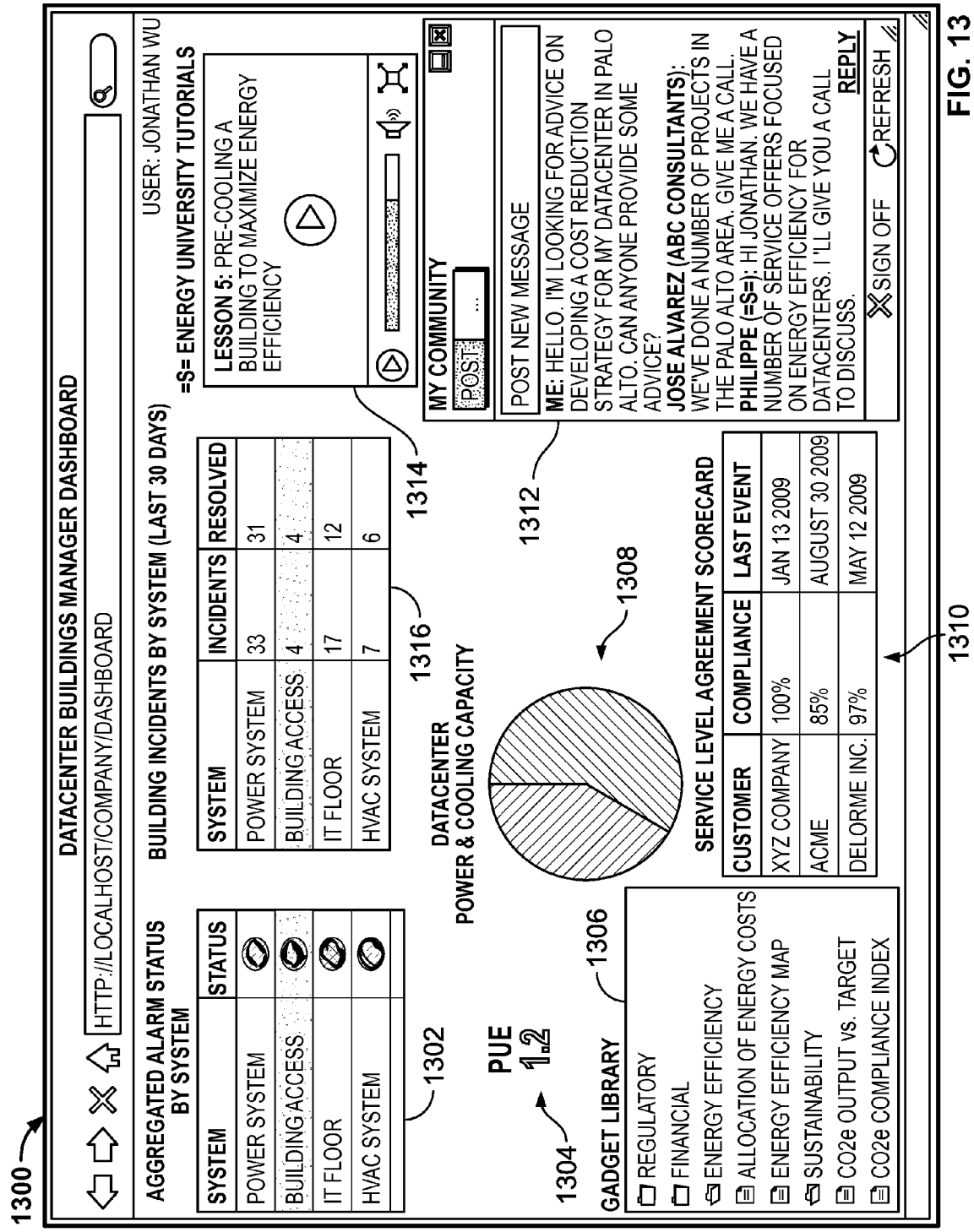
FIG. 13 is another example display of a portal used by a datacenter showing gadgets and other information based on data received from multiple sources.

FIG. 13 is another example display 1300 of a web portal 1118 shown in FIG. 11. This example portal display 1300 is one that might be accessed by a datacenter. Like FIG. 12, the portal display 1300 shown in FIG. 13 aggregates information supplied from various combinations of sources of data. An aggregated alarm module 1302 displays a list of current alarms or events aggregated from two or more systems 112, 114, 116, 118, 120. A PUE module 1304 displays a power utilization effectiveness (PUE) value indicative of the efficiency of the entire building (such as a datacenter) based on data provided by at least two systems 112, 114, 116, 118, 120. Previously, a PUE value is provided for a managed space within a building, but with the present disclosure, it is possible to calculate a PUE for an entire building, not just a managed space within the building. A gadget library module 1306 on the portal display 1300 is a dashboard constructed from a library of gadgets 1120 downloaded from the gadget store 1122 available from an Internet service 1112. A power and cooling capacity module 1308 provides high-level allocation of usage from multiple systems 112, 114, 116, 118, 120 into logical categories, such as depicted in pie chart form in this module 1308. A scorecard module 1310 combines data from one or more of the systems 112, 114, 116, 118, 120 and one or more third party systems to provide comparative or benchmarking information against competitors or other buildings/tenants. A chat module 1312 facilitates online communities of customers and partners using one or more Internet services 1112. A training and support module 1314 provides training and support tutorials provided by an Internet service 1112. An incident aggregation module 1316 lists incidents or events and resolutions aggregated from multiple systems 112, 114, 116, 118, 120.

Figure 14:
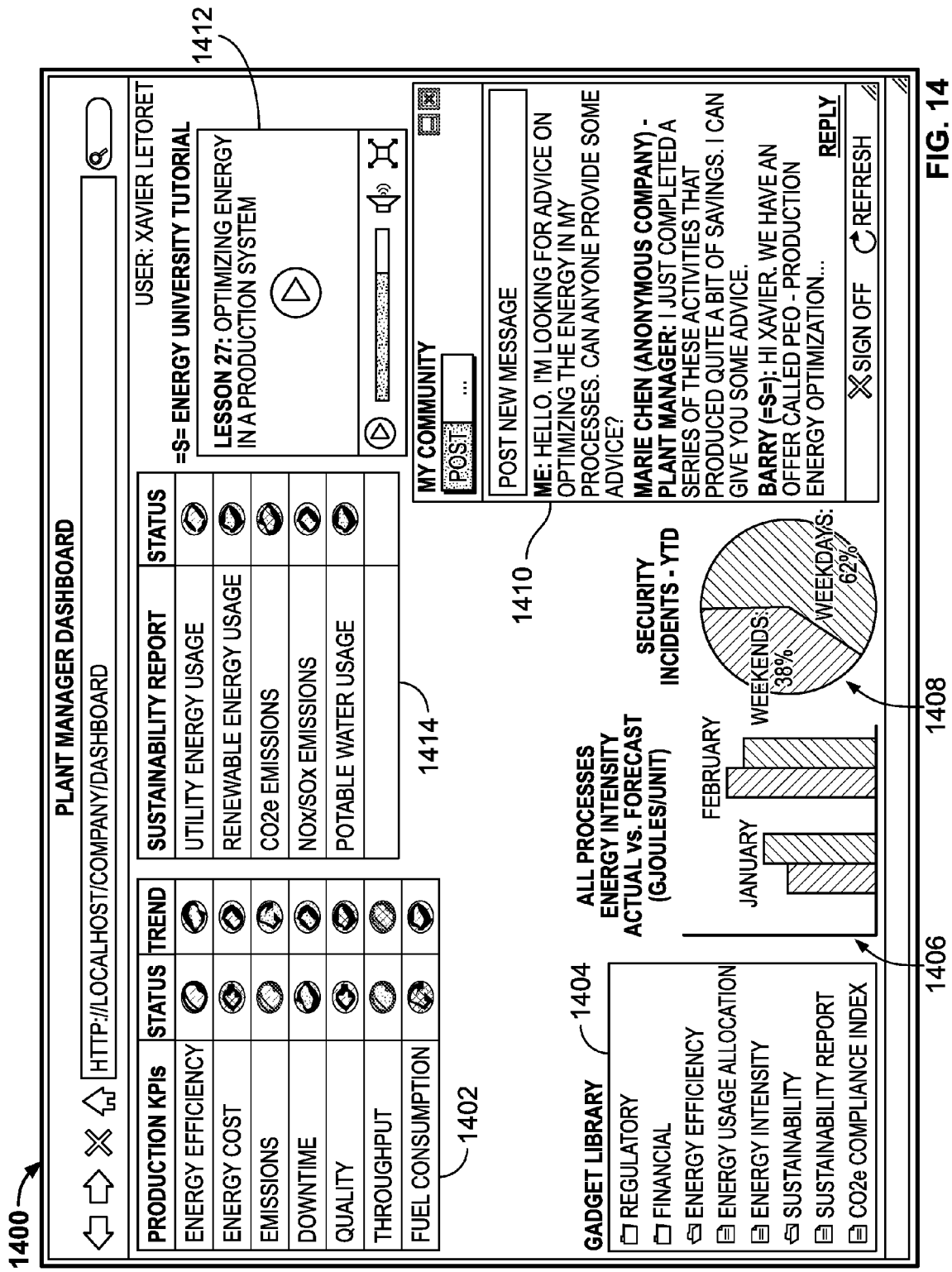
FIG. 14 is yet another example display of a portal used by a plant manager showing gadgets and other information based on data received from multiple sources.

FIG. 14 is yet another example display 1400 of a web portal 1118 shown in FIG. 11. This example portal display 1400 is one that might be accessed by a plant manager. The portal display 1400 aggregates content supplied from various combinations of sources of data—the systems 112, 114, 116, 118, 120, third party system(s) 1108, external portals or systems 1110, and/or Internet service(s) 1112. A production key performance indicator (KPI) module 1402 aggregates data from at least one system 112, 114, 116, 118, 120 and one or more third parties 1108. A gadget library module 1404 on the portal display 1400 is a dashboard constructed from a library of gadgets 1120 downloaded from the gadget store 1122 available from an Internet service 1112. An energy intensity module 1406 provides actual and forecasted energy intensity from all processes aggregated from data received from multiple systems 112, 114, 116, 118, 120. A security incidents module 1408 provides a high-level allocation of events from multiple systems 112, 114, 116, 118, 120 into logical categories. In this example pie chart, the percentage of security incidents that occur during the weekend is charted with the percentage of security incidents that occur during the weekdays. The data for this pie chart is aggregated from multiple systems, as security incidents can be reported by more than one system 112, 114, 116, 118, 120. A chat module 1410 facilitates online communities of customers and partners using one or more Internet services 1112. A training and support module 1412 provides training and support tutorials provided by an Internet service 1112. A sustainability report module 1414 aggregates and displays relevant KPIs from at least one system 112, 114, 116, 118, 120 using one or more Internet services 1112.

The underlying data for each of the gadgets and information shown in FIGS. 12-14 are exposed over web services (IP) in XML format, and relate to a consumable resource. By enforcing a common services interface (web services) and data interface (XML) among all data received at the data integration/aggregation module 1104, mashup algorithms can operate on multiple data sets and integrate them into a new data set that can be used to provide relevant information to the end-user relating to the consumable resource (a resource consumed by humans). In the illustrated examples, the data is related to energy, a type of consumable resource, and the information provided by the data relates to the consumption of energy. For example, the web portals can display output and target emissions caused by consumption of energy, energy efficiency, energy costs, energy optimization, power and cooling capacity, and tutorials for maximizing energy efficiency, to name a few. They can also display information relating to alarms aggregated by different systems monitoring a status of a consumable resource, such as energy consumption, or the security of a managed space.

Any Management Domain+Any Other Management Domain

A computer-implemented method of integrating data indicative of multiple sensed conditions received from multiple management domains, includes: receiving, at a computer first data from a first management domain comprising an arrangement of mutually related systems, the first data being indicative of at least one sensed condition in at least one of said mutually related systems, wherein the first data is communicated according to a communications protocol and formatted according to an application interface, and wherein the mutually related systems include a plurality of networked devices each of which communicates to another of the devices; receiving, at the computer second data from a second management domain comprising an arrangement of mutually related systems, the second data being indicative of at least one sensed condition in at least one of the mutually related systems of the second management domain, wherein the second data is communicated according to the same communications protocol as the first data and formatted according to the same application interface as the first data, and wherein the mutually related systems include a plurality of networked devices each of which communicates to another of the devices in the second system; storing the first data and the second data in a memory device accessible by the computer; displaying, on a video display coupled to the computer, a video image indicative of the first data and the second data; automatically determining, based on the first data and the second data and by the computer, an action related to a consumable resource; and displaying on the video display information indicative of the action.

The mutually related systems can be managed according to a common set of rules. At least one of the mutually related systems of the first management domain or the second management domain conforms to a hierarchical, collaborative, or portal-based system architecture. The first management domain and the second management domain each includes any two of a power management domain, a white space management domain, a process and machine management domain, a security management domain, or a building management domain. The action, if carried out, manages consumption of the consumable resource by at least one of the mutually related systems. The management of the consumption of the consumable resource includes adjusting the consumption of the consumable resource. The management of the consumption of the consumable resource includes reducing the consumption of the consumable resource. The action, if carried out, enhances a safety of one of at least one of the mutually related systems. The action, if carried out, enhances security at one of the mutually related systems by displaying on the video display a real-time video image of a physical location in at least one of the mutually related systems.

The consumable resource is water, air, gas, oil, a mineral, energy, or electrical power. The sensed condition is indicative of a characteristic of the consumable resource. The communications protocol includes an Internet Protocol (IP). The application interface includes a services interface and a data interface. The services interface includes web services and the data interface includes an extensible markup language (XML). At least one of the mutually related systems of the first management domain is a building management system that includes at least an air conditioning unit and the at least one of the mutually related systems of the second management domain is a data center that includes at least a server. At least one of the mutually related systems of the first management domain is a building management system that includes at least an air conditioning unit and the at least one of the mutually related systems of the second management domain is a power management system that includes at least one power monitoring device coupled to a portion of a power distribution system that includes the air conditioning unit for the building. The action, if carried out, sheds a load to protect a critical aspect of at least one of the mutually related systems. At least one of the mutually related systems of the first management domain is a power management system that includes at least one power monitoring device coupled to a portion of a power distribution system that includes the air conditioning unit for the building and wherein the least one of the mutually related systems of the second management domain is a data center that includes at least a server.

Mashup Framework

The method of integrating data can further include integrating the first data and the second data using a mashup application to produce integrated data; and transforming the integrated data using a mashup engine to produce a mashup output that is used to generate the video image. The displaying the video image is carried out using a web portal. The web portal includes a dashboard that displays a library of software gadgets available from a gadget store accessible via the Internet, at least one of the software gadgets receiving the first data and the second data. The application interface includes a services interface and a data interface. The services interface includes web services and the data interface includes an extensible markup language (XML). The sensed condition is indicative of a characteristic of the consumable resource. The communications protocol includes an Internet Protocol (IP), and wherein the mashup output is formatted using XML. The mutually related systems include any one or more of a power management system, a white space system, a process and machine system, a security system, or a building comfort system. The method can further include: receiving third data from a third party system in XML format over web services, the third data relating to the consumable resource; integrating the third data with fourth data indicative of a sensed condition in one of the mutually related systems using the mashup application to produce second integrated data; and displaying on the web portal information based on the second integrated data. The method can further include: receiving third data from an Internet service in XML format over web services, the third data relating to the consumable resource; integrating the third data with fourth data indicative of a sensed condition in one of the mutually related systems using the mashup application to produce second integrated data; and displaying on the web portal information based on the second integrated data.

The method of integrating data can further include: receiving third data from an external portal, the third data relating to the consumable resource; and displaying information based on the third data on the web portal. The video image is displayed in a first area of the web portal. The method can further include: integrating third data received from a third party system with fourth data exposed by one of the mutually related systems using the mashup application to produce second integrated data, the third data and the fourth data being exposed over web services in XML format; displaying information based on the second integrated data in a second area of the web portal; and displaying in a third area of the web portal a dashboard that includes a library of software gadgets available from a gadget store accessible from an Internet service, at least one of the software gadgets receiving data exposed by one of the mutually related systems over web services in XML format.

Building Management System+Data Center

A computer-implemented method of integrating data indicative of multiple sensed conditions received from multiple management domains, includes: receiving, at a computer first data from a building management system that includes at least an air conditioning unit, said first data being indicative of at least one sensed condition in a building that is managed by said building management system, wherein the first data is communicated according to a communications protocol and formatted according to an application interface, and wherein said building management system includes a plurality of networked devices each of which communicates to another of said devices; receiving, at said computer second data from a data center that includes at least a server, said second data being indicative of at least one sensed condition in the same building that is managed by said building management system, wherein the second data is communicated according to the same communications protocol as said first data and formatted according to the same application interface as said first data, wherein said data center is coupled to an arrangement of mutually related systems that include a plurality of networked devices each of which communicates to another of said devices; storing the first data and the second data in a memory device accessible by the computer; displaying, on a video display coupled to the computer, a video image indicative of the first data and the second data; automatically determining, based on the first data and the second data and by the computer, an action to be carried out by said building management system for controlling said air conditioning unit; and displaying on the video display information indicative of the action. The data center and the mutually related systems to which the data center is coupled are part of a white space system.

Building Management System+Data Center+Security Management System

The method of integrating data can further include: receiving, at the computer third data from a security management system that includes at least a video camera, the third data being indicative of a location or a device being monitored by the video camera in the building managed by the building management system, wherein the third data is communicated according to the same communications protocol as the first and second data and is formatted according to the same application interface as the first and second data, and wherein the security management system includes a plurality of networked devices each of which communicates to another of the devices.

Building Management System+Power Management System

A computer-implemented method of integrating data indicative of multiple sensed conditions received from multiple management domains, includes: receiving, at a computer first data from a building management system that includes at least an air conditioning unit, said first data being indicative of at least one sensed condition in a building that is managed by said building management system, wherein the first data is communicated according to a communications protocol and formatted according to an application interface, and wherein said building management system includes a plurality of networked devices each of which communicates to another of said devices; receiving, at said computer second data from a power management system that includes at least one power monitoring device coupled to a portion of a power distribution system that includes said air conditioning unit for said building, said second data being indicative of at least one sensed condition in the same building that is managed by said building management system, wherein the second data is communicated according to the same communications protocol as said first data and formatted according to the same application interface as said first data, wherein said power management system is coupled to an arrangement of mutually related systems that include a plurality of networked devices each of which communicates to another of said devices; storing the first data and the second data in a memory device accessible by the computer; displaying, on a video display coupled to the computer, a video image indicative of the first data and the second data; automatically determining, based on the first data and the second data and by the computer, an action to be carried out by said building management system to control power supplied to said air conditioning unit via said power distribution system; and displaying on the video display information indicative of the action.

Building Management System+Power Management System+Security Management System (Video Camera)

The method of integrating data can further include receiving, at the computer third data from a security management system that includes at least a video camera, the third data being indicative of a location or a device being monitored by the video camera in the building managed by the building management system, wherein the third data is communicated according to the same communications protocol as the first and second data and is formatted according to the same application interface as the first and second data, and wherein the security management system includes a plurality of networked devices each of which communicates to another of the devices.

Building Management System+Power Management System+Security Management System (Access Reader)

The method of integrating data can further include receiving, at the computer third data from a security management system that includes at least an access reader, the third data being indicative of an access-restricted location access to which is controlled by the access reader in the building managed by the building management system, wherein the third data is communicated according to the same communications protocol as the first and second data and is formatted according to the same application interface as the first and second data, and wherein the security management system includes a plurality of networked devices each of which communicates to another of the devices.

Power Management System+Data Center

A computer-implemented method of integrating data indicative of multiple sensed conditions received from multiple management domains, includes: receiving, at a computer first data from a power management system that includes at least one power monitor coupled to a portion of a power distribution system, said first data being indicative of at least one sensed condition in said power distribution system, wherein the second data is communicated according to a communications protocol and formatted according to an application interface, and wherein said power management system is coupled to an arrangement of mutually related systems that include a plurality of networked devices each of which communicates to another of said devices; receiving, at said computer second data from a data center that includes at least a server, said second data being indicative of at least one sensed condition in said power distribution system, wherein the second data is communicated according to the same communications protocol as said first data and formatted according to the same application interface as said first data, wherein said data center is coupled to an arrangement of mutually related systems that include a plurality of networked devices each of which communicates to another of said devices; storing the first data and the second data in a memory device accessible by the computer; displaying, on a video display coupled to the computer, a video image indicative of the first data and the second data; automatically determining, based on the first data and the second data and by the computer, an action to be carried out by said power management system for controlling said power distribution system; and displaying on the video display information indicative of the action.

Power Management System+Data Center+Security System

The method of integrating data can further include: receiving, at the computer third data from a security management system that includes at least a video camera, the third data being indicative of a location or a device being monitored by the video camera in the data center, wherein the third data is communicated according to the same communications protocol as the first and second data and is formatted according to the same application interface as the first and second data, and wherein the security management system includes a plurality of networked devices each of which communicates to another of the devices.

Power Management System+Process Control System

A computer-implemented method of integrating data indicative of multiple sensed conditions received from multiple management domains, comprising: receiving, at a computer first data from a power management system that includes at least one power monitor coupled to a portion of a power distribution system, said first data being indicative of at least one sensed condition in said power distribution system, wherein the second data is communicated according to a communications protocol and formatted according to an application interface, and wherein said power management system is coupled to an arrangement of mutually related systems that include a plurality of networked devices each of which communicates to another of said devices; receiving, at said computer second data from a process control system that includes at least one fluid flow monitor, said second data being indicative of at least one sensed condition in a fluid distribution system, wherein the second data is communicated according to the same communications protocol as said first data and formatted according to the same application interface as said first data, wherein said process control system is coupled to an arrangement of mutually related systems that include a plurality of networked devices each of which communicates to another of said devices; storing the first data and the second data in a memory device accessible by the computer; displaying, on a video display coupled to the computer, a video image indicative of the first data and the second data; automatically determining, based on the first data and the second data and by the computer, an action to be carried out by said process control system for controlling said fluid distribution system; and displaying on the video display information indicative of the action.

Power Management System+Process Control System+Security Management System

The method of integrating data can further include receiving, at the computer third data from a security management system that includes at least a video camera, the third data being indicative of a location or a device in the process control system being monitored by the video camera, wherein the third data is communicated according to the same communications protocol as the first and second data and is formatted according to the same application interface as the first and second data, and wherein the security management system includes a plurality of networked devices each of which communicates to another of the devices.

Building Management System+Process Control System

A computer-implemented method of integrating data indicative of multiple sensed conditions received from multiple management domains, includes: receiving, at a computer first data from a building management system that includes at least an air conditioning unit, said first data being indicative of at least one sensed condition in a building that is managed by said building management system, wherein the first data is communicated according to a communications protocol and formatted according to an application interface, and wherein said building management system includes a plurality of networked devices each of which communicates to another of said devices; receiving, at said computer second data from a process control system that includes at least one fluid flow monitor, said second data being indicative of at least one sensed condition in a fluid distribution system, wherein the second data is communicated according to the same communications protocol as said first data and formatted according to the same application interface as said first data, wherein said process control system is coupled to an arrangement of mutually related systems that include a plurality of networked devices each of which communicates to another of said devices;

The method of integrating data can further include storing the first data and the second data in a memory device accessible by the computer; displaying, on a video display coupled to the computer, a video image indicative of the first data and the second data; automatically determining, based on the first data and the second data and by the computer, an action to be carried out by said process control system for controlling said fluid distribution system; and displaying on the video display information indicative of the action. The fluid distribution system supplies a fluid to the building.

Building Management System+Process Control System+Security Management System (Camera)

The method of integrating data can further include receiving, at the computer third data from a security management system that includes at least a video camera, the third data being indicative of a location or a device being monitored by the video camera in the building managed by the building management system, wherein the third data is communicated according to the same communications protocol as the first and second data and is formatted according to the same application interface as the first and second data, and wherein the security management system includes a plurality of networked devices each of which communicates to another of the devices.

Building Management System+Process Control System+Security Management System (Access Reader)

The method of integrating data can further include receiving, at the computer third data from a security management system that includes at least an access reader, the third data being indicative of an access-restricted location access to which is controlled by the access reader in the building managed by the building management system, wherein the third data is communicated according to the same communications protocol as the first and second data and is formatted according to the same application interface as the first and second data, and wherein the security management system includes a plurality of networked devices each of which communicates to another of the devices.

Data Center+Process Control System

A computer-implemented method of integrating data indicative of multiple sensed conditions received from multiple management domains, includes: receiving, at a computer first data from a data center that includes at least a server, said first data being indicative of at least one sensed condition in the data center, wherein the first data is communicated according to a communications protocol and formatted according to an application interface, and wherein said data center includes a plurality of networked devices each of which communicates to another of said devices; receiving, at said computer second data from a process control system that includes at least one fluid flow monitor, said second data being indicative of at least one sensed condition in a fluid distribution system, wherein the second data is communicated according to the same communications protocol as said first data and formatted according to the same application interface as said first data, wherein said process control system is coupled to an arrangement of mutually related systems that include a plurality of networked devices each of which communicates to another of said devices; storing the first data and the second data in a memory device accessible by the computer; displaying, on a video display coupled to the computer, a video image indicative of the first data and the second data; automatically determining, based on the first data and the second data and by the computer, an action to be carried out by said process control system for controlling said fluid distribution system; and displaying on the video display information indicative of the action.

Data Center+Process Control System+Security Management System

The method of integrating data can further include receiving, at the computer third data from a security management system that includes at least a video camera, the third data being indicative of a location or a device being monitored by the video camera in the data center, wherein the third data is communicated according to the same communications protocol as the first and second data and is formatted according to the same application interface as the first and second data, and wherein the security management system includes a plurality of networked devices each of which communicates to another of the devices.

Data Center+Power Management System

A computer-implemented method of integrating data indicative of multiple sensed conditions received from multiple management domains, comprising: receiving, at a computer first data from a data center that includes at least a server, said first data being indicative of at least one sensed condition in a power distribution system, wherein the first data is communicated according to a communications protocol and formatted according to an application interface, wherein said data center is coupled to an arrangement of mutually related systems that include a plurality of networked devices each of which communicates to another of said devices; receiving, at the computer second data from a power management system that includes at least one power monitor coupled to a portion of said power distribution system, said second data being indicative of at least one sensed condition in said power distribution system, wherein the second data is communicated according to the same communications protocol as the first data and is formatted according to the same application interface as the first data, and wherein said power management system is coupled to an arrangement of mutually related systems that include a plurality of networked devices each of which communicates to another of said devices; storing the first data and the second data in a memory device accessible by the computer; displaying, on a video display coupled to the computer, a video image indicative of the first data and the second data; automatically determining, based on the first data and the second data and by the computer, an action to be carried out by said power management system in response to the first data received from the data center; and displaying on the video display information indicative of the action.

Data Center+Power Management System+Security Management System

The method of integrating data can further include receiving, at the computer third data from a security management system that includes at least a video camera, the third data being indicative of a location or a device being monitored by the video camera in the data center, wherein the third data is communicated according to the same communications protocol as the first and second data and is formatted according to the same application interface as the first and second data, and wherein the security management system includes a plurality of networked devices each of which communicates to another of the devices.

Building Management System+Power Management System+Data Center

A computer-implemented method of integrating data indicative of multiple sensed conditions received from multiple management domains, includes: receiving, at a computer first data from a building management system that includes at least an air conditioning unit, said first data being indicative of at least one sensed condition in a building that is managed by said building management system, wherein the first data is communicated according to a communications protocol and formatted according to a programming language, and wherein said building management system includes a plurality of networked devices each of which communicates to another of said devices; receiving, at said computer second data from a power management system that includes at least one power monitoring device coupled to a portion of a power distribution system that includes said air conditioning unit for said building, said second data being indicative of at least one sensed condition in the same building that is managed by said building management system, wherein the second data is communicated according to the same communications protocol as said first data and formatted according to the same programming language as said first data, wherein said power management system is coupled to an arrangement of mutually related systems that include a plurality of networked devices each of which communicates to another of said devices; receiving, at said computer third data from a data center that includes at least a server, said third data being indicative of at least one sensed condition in at least one of building management system and said power distribution system, wherein the third data is communicated according to the same communications protocol as said first data and formatted according to the same programming language as said first data, wherein said data center is coupled to an arrangement of mutually related systems that include a plurality of networked devices each of which communicates to another of said devices; storing the first, second and third data in a memory device accessible by the computer; displaying, on a video display coupled to the computer, a video image indicative of the first, second and third data; automatically determining, based on the first, second and third data and by the computer, an action to be carried out by said process control system for controlling said fluid distribution system or an action to be carried out by said power management system for controlling said power distribution system; and displaying on the video display information indicative of the action.

Building Management System+Power Management System+Data Center+Security Management System (Camera)

The method of integrating data can further include receiving, at the computer fourth data from a security management system that includes at least a video camera, the fourth data being indicative of a location or a device being monitored by the video camera in the building managed by the building management system, wherein the fourth data is communicated according to the same communications protocol as the first, second, and third data and is formatted according to the same application interface as the first, second, and third data, and wherein the security management system includes a plurality of networked devices each of which communicates to another of the devices.

Building Management System+Power Management System+Data Center+Security Management System (Access Reader)

The method of integrating data can further include receiving, at the computer fourth data from a security management system that includes at least an access reader, the fourth data being indicative of an access-restricted location access to which is controlled by the access reader in the building managed by the building management system, wherein the fourth data is communicated according to the same communications protocol as the first, second, and third data and is formatted according to the same application interface as the first, second, and third data, and wherein the security management system includes a plurality of networked devices each of which communicates to another of the devices.

Building Management System+Process Control System+Power Management System

A computer-implemented method of integrating data indicative of multiple sensed conditions received from multiple management domains, comprising: receiving, at a computer first data from a building management system that includes at least an air conditioning unit, said first data being indicative of at least one sensed condition in a building that is managed by said building management system, wherein the first data is communicated according to a communications protocol and formatted according to a programming language, and wherein said building management system includes a plurality of networked devices each of which communicates to another of said devices; receiving, at said computer second data from a process control system that includes at least one fluid flow monitor, said second data being indicative of at least one sensed condition in a fluid distribution system, wherein the second data is communicated according to the same communications protocol as said first data and formatted according to the same programming language as said first data, wherein said process control system is coupled to an arrangement of mutually related systems that include a plurality of networked devices each of which communicates to another of said devices; receiving, at said computer third data from a power management system that includes at least one power monitoring device coupled to a portion of a power distribution system that includes said air conditioning unit for said building, said third data being indicative of at least one sensed condition in the same building that is managed by said building management system, wherein the third data is communicated according to the same communications protocol as said first data and formatted according to the same programming language as said first data, wherein said power management system is coupled to an arrangement of mutually related systems that include a plurality of networked devices each of which communicates to another of said devices; storing the first, second and third data in a memory device accessible by the computer; displaying, on a video display coupled to the computer, a video image indicative of the first, second and third data; automatically determining, based on the first, second and third data and by the computer, an action to be carried out by said process control system for controlling said fluid distribution system or an action to be carried out by said power management system for controlling said power distribution system; and displaying on the video display information indicative of the action.

Building Management System+Process Control System+Power Management System+Security Management System (Camera)

The method of integrating data can further include receiving, at the computer fourth data from a security management system that includes at least a video camera, the fourth data being indicative of a location or a device being monitored by the video camera in the building managed by the building management system, wherein the fourth data is communicated according to the same communications protocol as the first, second, and third data and is formatted according to the same application interface as the first, second, and third data, and wherein the security management system includes a plurality of networked devices each of which communicates to another of the devices.

Building Management System+Process Control System+Power Management System+Security Management System (Access Reader)

The method of integrating data can further include receiving, at the computer fourth data from a security management system that includes at least an access reader, the fourth data being indicative of an access-restricted location access to which is controlled by the access reader in the building managed by the building management system, wherein the fourth data is communicated according to the same communications protocol as the first, second, and third data and is formatted according to the same application interface as the first, second, and third data, and wherein the security management system includes a plurality of networked devices each of which communicates to another of the devices.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A computer-implemented method of integrating data indicative of multiple sensed conditions received from multiple management domains, comprising:
   receiving, at a computer first data from a first management domain comprising an arrangement of mutually related systems, the first data being indicative of at least one sensed condition in at least one of the mutually related systems, wherein the first data is communicated according to a communications protocol and formatted according to an application interface, wherein the mutually related systems include a plurality of networked devices each of which communicates to another of the devices;
   receiving, at the computer second data from a second management domain comprising an arrangement of mutually related systems, the second data being indicative of at least one sensed condition in at least one of the mutually related systems of the second management domain, wherein the second data is communicated according to the communications protocol and formatted according to the application interface, wherein the mutually related systems include a plurality of networked devices each of which communicates to another of the devices in the second system;
   storing the first data and the second data in a memory device accessible by the computer;
   integrating the first data and the second data using a mashup application to produce first integrated data;
   transforming the first integrated data using a mashup engine to produce a mashup output that is used to generate a video image indicative of the mashup output;
   displaying the video image in a first area of a web portal on a video display coupled to the computer;
   automatically determining, based on the first data and the second data and by the computer, an action related to a consumable resource;
   displaying on the video display information indicative of the action;
   receiving, at the computer, third data from a third party system;
   integrating the third data received from the third party system with fourth data exposed by one of the mutually related systems using the mashup application to produce second integrated data; and
   displaying information based on the second integrated data in a second area of the web portal.

2. The method of claim 1 in which the mutually related systems are managed according to a common set of rules.

3. The method of claim 1, wherein the at least one of the mutually related systems of the first management domain or the second management domain conforms to a hierarchical, collaborative, or portal-based system architecture.

4. The method of claim 1, wherein the first management domain and the second management domain includes any two of a power management domain, a white space management domain, a process and machine management domain, a security management domain, or a building management domain.

5. The method of claim 1, wherein the action, if carried out, manages consumption of the consumable resource by at least one of the mutually related systems.

6. The method of claim 5, wherein the management of the consumption of the consumable resource includes adjusting the consumption of the consumable resource.

7. The method of claim 5, wherein the management of the consumption of the consumable resource includes reducing the consumption of the consumable resource.

8. The method of claim 1, wherein the action, if carried out, enhances a safety of one of at least one of the mutually related systems.

9. The method of claim 1, wherein the action, if carried out, enhances security at one of the mutually related systems by displaying on the video display a real-time video image of a physical location in at least one of the mutually related systems.

10. The method of claim 1, wherein the consumable resource is water, air, gas, oil, a mineral, energy, or electrical power.

11. The method of claim 1, wherein the communications protocol includes an Internet Protocol (IP).

12. The method of claim 1, wherein the application interface includes a services interface and a data interface.

13. The method of claim 12, wherein the services interface includes web services and the data interface includes an extensible markup language (XML).

14. The method of claim 1, wherein the at least one of the mutually related systems of the first management domain is a building management system that includes at least an air conditioning unit and the at least one of the mutually related systems of the second management domain is a data center that includes at least a server.

15. The method of claim 1, wherein the at least one of the mutually related systems of the first management domain is a building management system that includes at least an air conditioning unit and the at least one of the mutually related systems of the second management domain is a power management system that includes at least one power monitoring device coupled to a portion of a power distribution system that includes the air conditioning unit for the building.

16. The method of claim 15, wherein the action, if carried out, sheds a load to protect a critical aspect of at least one of the mutually related systems.

17. The method of claim 1, wherein the at least one of the mutually related systems of the first management domain is a power management system that includes at least one power monitoring device coupled to a portion of a power distribution system that includes the air conditioning unit for the building and wherein the least one of the mutually related systems of the second management domain is a data center that includes at least a server.

18. The method of claim 1, wherein the web portal includes a dashboard that displays a library of software gadgets available from a gadget store accessible via the Internet, at least one of the software gadgets receiving the first data and the second data.

19. The method of claim 1, wherein the application interface includes a services interface and a data interface, wherein the services interface includes web services and the data interface includes an extensible markup language (XML), wherein the sensed condition is indicative of a characteristic of the consumable resource, wherein the communications protocol includes an Internet Protocol (IP), and wherein the mashup output is formatted using XML.

20. The method of claim 1, wherein the mutually related systems include any one or more of a power management system, a white space system, a process and machine system, a security system, or a building comfort system, and wherein receiving the third data from a third party system includes receiving the third data in XML format over web services, the third data relating to the consumable resource.

21. The method of claim 1, wherein the mutually related systems include any one or more of a power management system, a white space system, a process and machine system, a security system, or a building comfort system, and wherein receiving the third data from the third party system includes receiving the third data from an Internet service in XML format over web services, the third data relating to the consumable resource.

22. The method of claim 1, wherein receiving the third data from the third party system includes receiving the third data from an external portal, the third data relating to the consumable resource.

23. The method of claim 1, further comprising:
displaying in a third area of the web portal a dashboard that includes a library of software gadgets available from a gadget store accessible from an Internet service, at least one of the software gadgets receiving data exposed by one of the mutually related systems over web services in XML format.

24. A computer-implemented method of integrating data indicative of multiple sensed conditions received from multiple management domains, comprising:
receiving, at a computer first data from a building management system that includes at least an air conditioning unit, the first data being indicative of at least one sensed condition in a building that is managed by the building management system, wherein the first data is communicated according to a communications protocol and formatted according to an application interface, and wherein the building management system includes a plurality of networked devices each of which communicates to another of the devices;
receiving, at the computer second data from a data center that includes at least a server, the second data being indicative of at least one sensed condition in the same building that is managed by the building management system, wherein the second data is communicated according to the communications protocol and formatted according to the application interface, wherein the data center is coupled to an arrangement of mutually related systems that include a plurality of networked devices each of which communicates to another of the devices;
storing the first data and the second data in a memory device accessible by the computer;
integrating the first data and the second data using a mashup application to produce first integrated data;
transforming the first integrated data using a mashup engine to produce a mashup output that is used to generate a video image indicative of the mashup output;
displaying the video image in a first area of a web portal on a video display coupled to the computer;
automatically determining, based on the first data and the second data and by the computer, an action to be carried out by the building management system for controlling the air conditioning unit;
displaying on the video display information indicative of the action;
receiving, at the computer third data, wherein the third data is communicated according to the communications protocol and is formatted according to the application interface:
integrating the third data with fourth data exposed by one of the mutually related systems using the mashup application to produce second integrated data; and
displaying information based on the second integrated data in a second area of the web portal.

25. The method of claim 24, wherein the data center and the mutually related systems to which the data center is coupled are part of a white space system.

26. The method of claim 24, wherein receiving the third data includes receiving the third data from a security management system that includes at least a video camera, the third data being indicative of a location or a device being monitored by the video camera in the building managed by the building management system and wherein the security management system includes a plurality of networked devices each of which communicates to another of the devices.

27. A computer-implemented method of integrating data indicative of multiple sensed conditions received from multiple management domains, comprising:
receiving, at a computer first data from a building management system that includes at least an air conditioning unit, the first data being indicative of at least one sensed condition in a building that is managed by the building management system, wherein the first data is communicated according to a communications protocol and formatted according to an application interface, and wherein the building management system includes a plurality of networked devices each of which communicates to another of the devices;
receiving, at the computer second data from a power management system that includes at least one power monitoring device coupled to a portion of a power distribution system that includes the air conditioning unit for the building, the second data being indicative of at least one sensed condition in the same building that is managed by the building management system, wherein the second data is communicated according to the communications protocol and formatted according to the application interface, wherein the power management system is coupled to an arrangement of mutually related systems that include a plurality of networked devices each of which communicates to another of the devices;
storing the first data and the second data in a memory device accessible by the computer;
integrating the first data and the second data using a mashup application to produce first integrated data;

transforming the first integrated data using a mashup engine to produce a mashup output that is used to generate a video image indicative of the mashup output;

displaying the video image in a first area of a web portal on a video display coupled to the computer;

automatically determining, based on the first data and the second data and by the computer, an action to be carried out by the building management system to control power supplied to the air conditioning unit via the power distribution system;

displaying on the video display information indicative of the action;

receiving, at the computer third data, wherein the third data is communicated according to the communications protocol and is formatted according to the application interface;

integrating the third data with fourth data exposed by one of the mutually related systems using the mashup application to produce second integrated data; and displaying information based on the second integrated data in a second area of the web portal.

28. The method of claim 27, wherein receiving third data includes receiving the third data from a security management system that includes at least a video camera, the third data being indicative of a location or a device being monitored by the video camera in the building managed by the building management system, and wherein the security management system includes a plurality of networked devices each of which communicates to another of the devices.

29. The method of claim 27, wherein receiving third data includes receiving the third data from a security management system that includes at least an access reader, the third data being indicative of an access-restricted location access to which is controlled by the access reader in the building managed by the building management system and wherein the security management system includes a plurality of networked devices each of which communicates to another of the devices.

30. A computer-implemented method of integrating data indicative of multiple sensed conditions received from multiple management domains, comprising:

receiving, at a computer first data from a building management system that includes at least an air conditioning unit, the first data being indicative of at least one sensed condition in a building that is managed by the building management system, wherein the first data communicated according to a communications protocol and formatted according to an application interface, wherein the building management system includes a plurality of networked devices each of which communicates to another of the devices;

receiving, at the computer second data from a process control system that includes at least one fluid flow monitor, the second data being indicative of at least one sensed condition in a fluid distribution system, wherein the second data is communicated according to the communications protocol and formatted according to the application interface, wherein the process control system is coupled to an arrangement of mutually related systems that include a plurality of networked devices each of which communicates to another of the devices;

storing the first data and the second data in a memory device accessible by the computer;

integrating the first data and the second data using a mashup application to produce first integrated data;

transforming the first integrated data using a mashup engine to produce a mashup output that is used to generate a video image indicative of the mashup output;

displaying the video image in a first area of a web portal on a video display coupled to the computer;

automatically determining, based on the first data and the second data and by the computer, an action to be carried out by the process control system for controlling the fluid distribution system;

displaying on the video display information indicative of the action;

receiving, at the computer third data, wherein the third data is communicated according to the communications protocol and is formatted according to the application interface;

integrating the third data with fourth data exposed by one of the mutually related systems using the mashup application to produce second integrated data; and displaying information based on the second integrated data in a second area of the web portal.

31. The method of claim 30, wherein the fluid distribution system supplies a fluid to the building.

32. The method of claim 30, wherein receiving third data includes receiving the third data from a security management system that includes at least a video camera, the third data being indicative of a location or a device being monitored by the video camera in the building managed by the building management system and wherein the security management system includes a plurality of networked devices each of which communicates to another of the devices.

33. The method of claim 30, wherein receiving third data includes receiving the third data from a security management system that includes at least an access reader, the third data being indicative of an access-restricted location access to which is controlled by the access reader in the building managed by the building management system and wherein the security management system includes a plurality of networked devices each of which communicates to another of the devices.

34. A computer-implemented method of integrating data indicative of multiple sensed conditions received from multiple management domkains, comprising:

receiving, at a computer first data from a building management system that includes at least an air conditioning unit, the first data being indicative of at least one sensed condition in a building that is managed by the building management system, wherein the first data is communicated according to a communications protocol and formatted according to a programming language, wherein the building management system includes a plurality of networked devices each of which communicates to another of the devices;

receiving, at the computer second data from a power management system that includes at least one power monitoring device coupled to a portion of a power distribution system that includes the air conditioning unit for the building, the second data being indicative of at least one sensed condition in the same building that is managed by the building management system, wherein the second data is communicated according to the communications protocol and formatted according to the programming language, wherein the power management system is coupled to an arrangement of mutually related systems that include a plurality of networked devices each of which communicates to another of the devices;

receiving, at the computer third data from a data center that includes at least a server, the third data being indicative of at least one sensed condition in at least one of the building management system and the power distribution system, wherein the third data is communicated according to the communications protocol and formatted according to the programming language, wherein the data center is coupled to an arrangement of mutually related systems that include a plurality of networked devices each of which communicates to another of the devices;

storing the first, second and third data in a memory device accessible by the computer;

integrating the first data, the second data, and the third data using a mashup application to produce first integrated data;

transforming the first integrated data using a mashup engine to produce a mashup output that is used to generate a video image indicative of the mashup output;

displaying the video image in a first area of a web portal on a video display coupled to the computer;

automatically determining, based on the first, second and third data and by the computer, an action to be carried out by the building management system for controlling the air conditioning unit or an action to be carried out by the power management system for controlling the power distribution system;

displaying on the video display information indicative of the action;

integrating the third data received with fourth data exposed by one of the mutually related systems using the mashup application to produce second integrated data; and displaying information based on the second integrated data in a second area of the web portal.

35. The method of claim 34, further comprising:

receiving, at the computer fourth data from a security management system that includes at least a video camera, the fourth data being indicative of a location or a device being monitored by the video camera in the building managed by the building management system, wherein the fourth data is communicated according to the communications protocol and is formatted according to the programming language, and wherein the security management system includes a plurality of networked devices each of which communicates to another of the devices.

36. The method of claim 34, further comprising:

receiving, at the computer fourth data from a security management system that includes at least an access reader, the fourth data being indicative of an access-restricted location access to which is controlled by the access reader in the building managed by the building management system, wherein the fourth data is communicated according to the communications protocol and is formatted according to the programming language, and wherein the security management system includes a plurality of networked devices each of which communicates to another of the devices.

37. The method of claim 1, wherein the sensed condition is indicative of a characteristic of the consumable resource.

* * * * *